United States Patent
Liu et al.

(10) Patent No.: US 11,753,181 B2
(45) Date of Patent: Sep. 12, 2023

(54) SYSTEM AND METHOD FOR VISUAL AIDED LANDING

(71) Applicant: HONEYWELL INTERNATIONAL INC., Charlotte, NC (US)

(72) Inventors: Yang Liu, Shanghai (CN); Wenwan Feng, Shanghai (CN); Chao Wang, Shanghai (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 337 days.

(21) Appl. No.: 17/217,437

(22) Filed: Mar. 30, 2021

(65) Prior Publication Data
US 2022/0315242 A1 Oct. 6, 2022

(51) Int. Cl.
| | |
|---|---|
| G06F 17/00 | (2019.01) |
| B64D 45/08 | (2006.01) |
| G06V 10/44 | (2022.01) |
| G06V 20/10 | (2022.01) |
| G08G 5/00 | (2006.01) |

(52) U.S. Cl.
CPC ............ B64D 45/08 (2013.01); G06V 10/44 (2022.01); G06V 20/182 (2022.01); G08G 5/0047 (2013.01)

(58) Field of Classification Search
CPC ...... B64D 45/08; G06V 10/44; G06V 20/182; G08G 5/0047; G08G 5/0021; G08G 5/0086; G08G 5/025; G05D 1/0038; G05D 1/0676
USPC .......................................................... 701/16
See application file for complete search history.

(56) References Cited

U.S. PATENT DOCUMENTS

| | | | | |
|---|---|---|---|---|
| 6,157,876 A | * | 12/2000 | Tarleton, Jr. ......... | G05D 1/0676 342/63 |
| 6,952,632 B2 | * | 10/2005 | Robert ................. | G05D 1/0676 701/16 |
| 7,948,403 B2 | * | 5/2011 | Hartman ............... | G08G 5/025 701/16 |

(Continued)

FOREIGN PATENT DOCUMENTS

| | | |
|---|---|---|
| EP | 2728565 A2 | 5/2014 |
| KR | 100985195 B1 | 10/2010 |

OTHER PUBLICATIONS

Unmanned Aerial Vehicle's Runway Landing System (Year: 2020).*
Vision Based Alignment to Runway (Year: 214).*

*Primary Examiner* — Ronnie M Mancho
(74) *Attorney, Agent, or Firm* — Lorenz & Kopf LLP

(57) ABSTRACT

A method for providing cues to an aerial vehicle operator is disclosed. The method includes: determining when a vehicle is on final approach; processing a plurality of ground images of a ground path ahead of the vehicle; identifying a lane in the processed ground images; determining whether the identified lane corresponds to an assigned runway based on a relative position or a relative geometry of the identified lane; tracking during landing a left and a right side edge, a front edge, and a runway center line of the assigned runway; determining, relative to the runway center line, whether a relative position of the vehicle during landing is left of, right of, or aligned with the runway center line; and providing visual and/or audible guidance to the vehicle operator to take corrective action when the relative position of the vehicle during landing is not aligned with the runway center line.

20 Claims, 11 Drawing Sheets

(56) References Cited

U.S. PATENT DOCUMENTS

| | | | | |
|---|---|---|---|---|
| 8,193,948 B1* | 6/2012 | Shapiro | G01C 23/005 | 701/16 |
| 8,234,058 B1* | 7/2012 | Barber | G08G 5/025 | 701/120 |
| 8,589,071 B2* | 11/2013 | Feyereisen | G08G 5/025 | 701/16 |
| 8,718,915 B1* | 5/2014 | Turcios | G08G 5/0021 | 701/3 |
| 8,880,328 B2* | 11/2014 | Ovens | G08G 5/0021 | 701/506 |
| 9,174,746 B1* | 11/2015 | Bell | G01C 23/00 | |
| 9,260,180 B2* | 2/2016 | Puyou | G08G 5/025 | |
| 9,569,668 B2* | 2/2017 | Schertler | G06V 20/182 | |
| 9,731,838 B2* | 8/2017 | Conner | B64D 45/00 | |
| 9,891,632 B1* | 2/2018 | Irwin | G05D 1/0676 | |
| 10,332,405 B2* | 6/2019 | Kopardekar | G08G 5/0091 | |
| 10,347,142 B2* | 7/2019 | Brandao | G08G 5/0021 | |
| 10,793,286 B1 | 10/2020 | Carrico et al. | | |
| 2009/0201190 A1* | 8/2009 | Huthoefer | G08G 5/0026 | 342/36 |
| 2010/0250030 A1* | 9/2010 | Nichols | G08G 5/0021 | 701/3 |
| 2011/0282580 A1* | 11/2011 | Mohan | G01S 19/485 | 701/472 |
| 2012/0265376 A1* | 10/2012 | Fleiger-Holmes | G01S 1/18 | 701/16 |
| 2016/0026189 A1 | 1/2016 | Boada-Bauxell et al. | | |
| 2016/0086497 A1* | 3/2016 | Williams | G08G 5/0069 | 701/16 |
| 2016/0093225 A1* | 3/2016 | Williams | G01C 21/20 | 701/17 |
| 2017/0249850 A1* | 8/2017 | Shand | G08G 5/0043 | |
| 2018/0130362 A1* | 5/2018 | King | G08G 5/045 | |
| 2018/0233052 A1* | 8/2018 | Shamasundar | G08G 5/065 | |
| 2019/0019423 A1* | 1/2019 | Choi | G08G 5/045 | |
| 2019/0235523 A1* | 8/2019 | Rozenberg | G06V 10/42 | |
| 2020/0027362 A1 | 1/2020 | Dame et al. | | |
| 2021/0090444 A1* | 3/2021 | Bortolini | G08G 5/0021 | |
| 2021/0254997 A1* | 8/2021 | Chaubey | B64D 43/02 | |
| 2021/0383703 A1* | 12/2021 | Venkataramana | G05D 1/042 | |
| 2022/0215759 A1* | 7/2022 | Edwards | G06F 16/26 | |

* cited by examiner

SYSTEM AND METHOD FOR VISUAL AIDED LANDING

TECHNICAL FIELD

Embodiments of the subject matter described herein relate generally to landing aids. More particularly, embodiments of the subject matter relate to visually-based landing aids.

BACKGROUND

For a flying vehicle, such as a manned aircraft or an Unmanned Aerial Vehicle (UAV), landing can be a challenging and critical phase during a flight mission. For commercial aircraft, a precise ground landing-aided system, such as an ILS (Instrument Landing System) or a GBAS (Ground Based Augmentation System), may be installed at a busy airport to aid with final approach and landing operations or to support automatic landing operations.

Because the cost and complexity of installation and maintenance of such ground-based precision landing systems are significant, they are not available at most airports and especially not at general aviation (GA) airports, which have relatively small operating budgets. Hence for GA pilots, they normally perform a see and landing procedure, wherein they set up visual contact with a runway and determine an aircraft's position in space relative to the runway based on their training and experience, make adjustments to align the aircraft with the runway center line, and make adjustments to stabilize the aircraft on a correct glide path for touch down. Because of the high workload during landing, limited experience, lack of familiarity with an airport, or other factors, a pilot could make human mistakes by not noticing and correcting a deviation from a three dimensional landing path at an early stage, which could result in an unstable approach, a hard landing, a go around maneuver, a runway overrun/excursion, or even landing on a wrong surface.

Additionally, the use of Remotely Piloted Aircraft (RPA) or Unmanned Aerial Vehicles (UAV) are expanding in many domains such as photography, inspection, and cargo transportation. General Aviation (GA) airports may be ideally located to support these vehicles operations. Landing these vehicles at GA airports, however, can be challenging. Remote pilots may have more difficulty landing an RPA or UAV due to limited visibility range, less real feel from the vehicle, and a time delay between command and response.

Hence, it is desirable to provide systems and methods for a low cost onboard landing aid to assist vehicle operators during landing operations. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A visually-based landing aid system for providing visual cues to an aerial vehicle operator is disclosed. The system includes a controller configured to: determine when a vehicle is on final approach to a landing runway based on monitored aerial vehicle status information; process, responsive to determining that the vehicle is on final approach to the landing runway, a plurality of ground images of a ground path ahead of the vehicle retrieved from an image sensor on the vehicle; identify a lane in the processed ground images; determine whether the identified lane from the processed ground images corresponds to an assigned runway for landing based on a relative position of the identified lane relative to another lane in the ground images or a relative geometry of the identified lane relative to another lane in the ground images when landing zone markings are not recognized in the ground images or recognized landing zone markings in the ground images are not sufficient to determine that the identified lane is the assigned runway; track during landing, based on the processed ground images, a left and a right side edge, a front edge, and a runway center line of the assigned runway; determine, relative to the runway center line, whether a relative position of the vehicle during landing is left of, right of, or aligned with the runway center line; and provide visual and/or audible guidance to the vehicle operator to take corrective action when the relative position of the vehicle during landing is not aligned with the runway center line. The controller may be further configured to: predict, based on the processed image information and aerial vehicle status information, whether a glide path of the vehicle will result in vehicle wheel touch down inside an expected landing zone; and provide visual and/or audible guidance (e.g., alerting or/and correction cues) to the vehicle operator to take corrective action when the predicted touch down is outside of the expected landing zone (e.g., resulting in an under-shoot or an overshoot of the assigned runway).

A method for providing visual cues to an aerial vehicle operator is disclosed. The method includes: determining when a vehicle is on final approach to a landing runway based on monitored aerial vehicle status information; processing, responsive to determining that the vehicle is on final approach to the landing runway, a plurality of ground images of a ground path ahead of the vehicle retrieved from an image sensor on the vehicle; identifying a lane in the processed ground images; determining whether the identified lane from the processed ground images corresponds to an assigned runway for landing based on a relative position of the identified lane relative to another lane in the ground images or a relative geometry of the identified lane relative to another lane in the ground images when landing zone markings are not recognized in the ground images or recognized landing zone markings in the ground images are not sufficient to determine that the identified lane is the assigned runway; tracking during landing, based on the processed ground images, a left and a right side edge, a front edge, and a runway center line of the assigned runway; determining, relative to the runway center line, whether a relative position of the vehicle during landing is left of, right of, or aligned with the runway center line; and providing visual and/or audible guidance to the vehicle operator to take corrective action when the relative position of the vehicle during landing is not aligned with the runway center line. The method may further include: predicting, based on the processed image information and aerial vehicle status information, whether a glide path of the vehicle will result in vehicle wheel touch down inside an expected landing zone; and providing visual and/or audible guidance to the vehicle operator to take corrective action when the predicted touch down is outside of the expected landing zone.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

Figure 1:
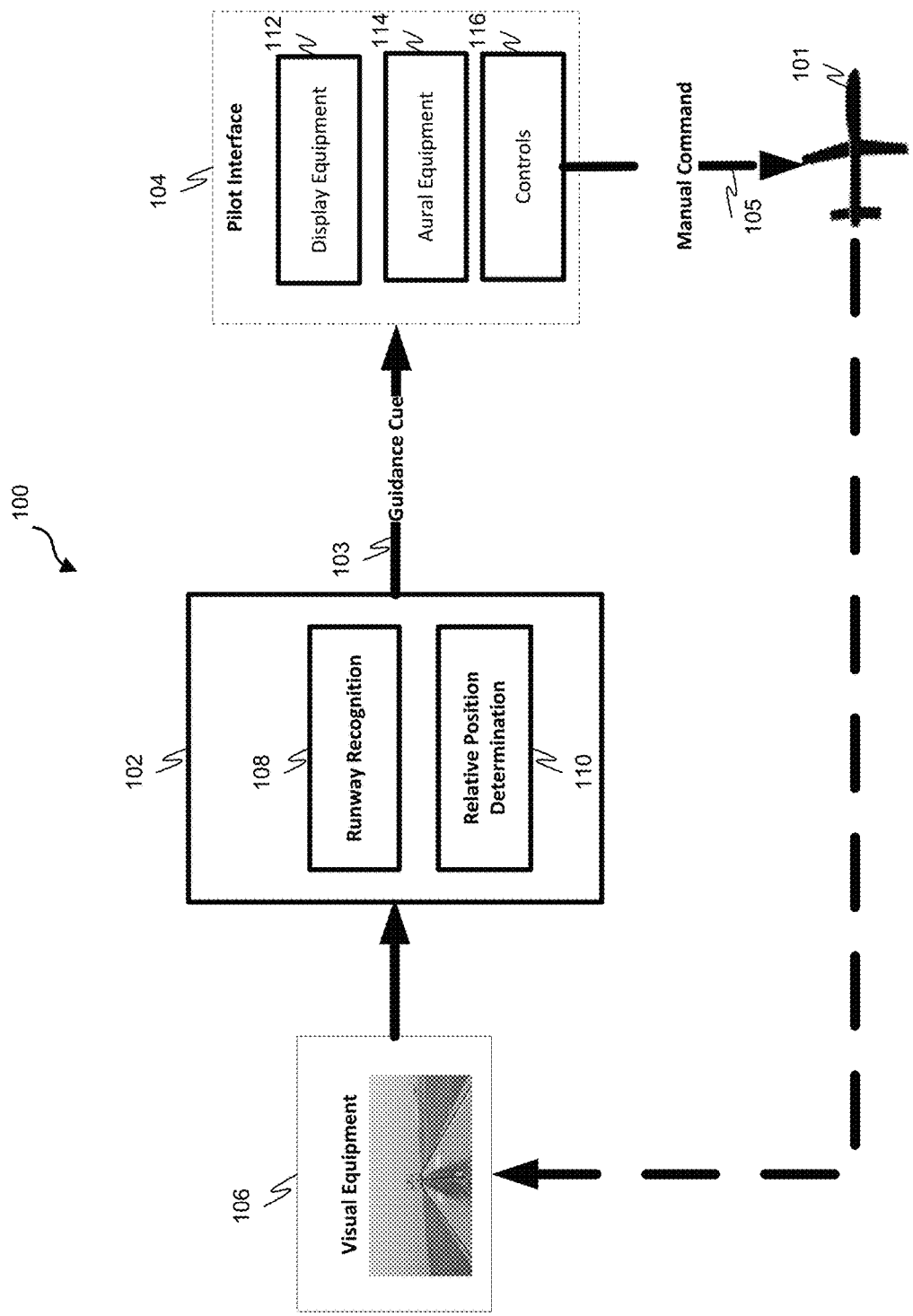
FIG. 1 is a block diagram depicting an example aerial vehicle environment in which a landing aid system may be provided, in accordance with some embodiments.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical components and various processing steps. It should be appreciated that such functional and/or logical components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques and articles for providing a unique and low cost visual aided approach and landing system for an aerial vehicle that is configured to analyze ground images, identify a target runway to track, monitor and determine the vehicle's relative position with regard to the target runway and a predetermined approach/landing path, and provide indications/alerting to the pilots/operators of the vehicle to aid with landing operations of the vehicle (e.g., unmanned aerial vehicle (UAV), remotely piloted aircraft (RPA), general aviation (GA) aircraft, and others). The apparatus, systems, techniques, and articles provided herein can allow for greater tolerance regarding the quality of the ground images (e.g., poor image quality could be caused by low visibility or the runway not having clear markings) because guidance that is provided is based on the vehicle's relative position to the target runway instead of an absolute position or deviation. Thus, the accuracy requirements for the visual equipment and the image processing performance can be looser, and the apparatus, systems, techniques, and articles provided herein can be more adaptive in different landing scenarios/environments.

FIG. 1 is a block diagram depicting an example aerial vehicle environment 100 in which a visually-based landing aid system 102 may be provided. The example visually-based landing aid system 102 is configured to determine, based on ground images, a need for corrective action during landing operations and provide visual and/or aural cues to an aerial vehicle operator, e.g., via a pilot interface 104 (for an onboard or remote pilot), during aerial vehicle landing operations to cue the vehicle operator to make course corrections, via manual commands 105, to allow the aerial vehicle 101 to land safely. The example aerial vehicle environment 100 includes onboard visual equipment 106 (e.g., camera, forward-looking infrared (FLIR), millimeter wave radar, etc.) and a processing component (e.g., a controller) of the visually-based landing aid system 102 that implements a runway recognition module 108 and a relative position determination module 110.

The processing component (e.g., a controller) includes at least one processor and a computer-readable storage device or media encoded with programming instructions for configuring the processing component. The processor may be any custom-made or commercially available processor, a central processing unit (CPU), a graphics processing unit (GPU), an application specific integrated circuit (ASIC), a field programmable gate array (FPGA), an auxiliary processor among several processors associated with the processing component, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the processing component.

The example visually-based landing aid system 102 is configured, via the processing component, to determine when an aerial vehicle is on final approach to a landing runway based on monitored aerial vehicle status information. Responsive to determining that the vehicle is on final approach to the landing runway, the example visually-based landing aid system 102 (e.g., via the runway recognition module 108) is configured to receive a plurality of successive ground images taken by the visual equipment 106, process the plurality of ground images of a ground path ahead of the vehicle received from the visual equipment 106, and perform digital processing to identify a lane in the processed ground images and determine whether the identified lane corresponds to an assigned runway for landing.

The example runway recognition module 108 is further configured to apply a voting algorithm to determine whether the identified lane corresponds to an assigned runway for landing. An example voting algorithm weighs data regarding recognized landing zone markings of the identified lane if available, a relative position of the identified lane based on destination configuration data, and a relative geometry of the identified lane to determine whether the identified lane corresponds to an assigned runway for landing.

The example visually-based landing aid system 102 is further configured, via the processing component (e.g., via the relative position determination module 110), to perform further runway edge processing and perform geometric calculations to determine the relationship of the vehicle to a predetermine approach/landing path, and produce guidance cues. To accomplish this, the example visually-based landing aid system 102 (e.g., via the relative position determination module 110) is configured to track during landing operations based on the processed ground images a left and a right side edge, a front edge, and a runway center line of the assigned runway, determine relative to the runway center line whether a relative position of the vehicle during landing operations is left of, right of, or aligned with the runway center line, and provide visual and/or audible guidance (e.g., alerting or/and correction cues) to the vehicle operator to take corrective action when the relative position of the vehicle during landing is not aligned with the runway center line.

The example visually-based landing aid system 102 is further configured to predict (e.g., via the relative position determination module 110), based on the processed image information and aerial vehicle status information, whether a glide path of the vehicle will result in vehicle wheel touch down inside an expected landing zone, and provide (e.g., via the relative position determination module 110) visual and/or audible guidance (e.g., alerting or/and correction cues) to the vehicle operator to take corrective action when the predicted touch down is outside of the expected landing zone (e.g., resulting in an under-shoot or an overshoot of the assigned runway).

The example aerial vehicle environment 100 also includes the pilot interface 104, for use by the vehicle operator (e.g., onboard operator or remote operator) which may be onboard the aerial vehicle or in a control center (e.g., in the case of a UAV or RPA). The example pilot interface 104 includes display equipment 112 for displaying visual alerts, aural equipment 114 for making aural alerts audible to the vehicle operator, and controls 116 (e.g., a keypad, touchpad, keyboard, mouse, touch panel, or touchscreen, joystick, control column, knob, line select key or the like) for allowing the vehicle operator to take corrective action in response to the visual and/or audible guidance provided by the visually-based landing aid system 102.

Figure 2:
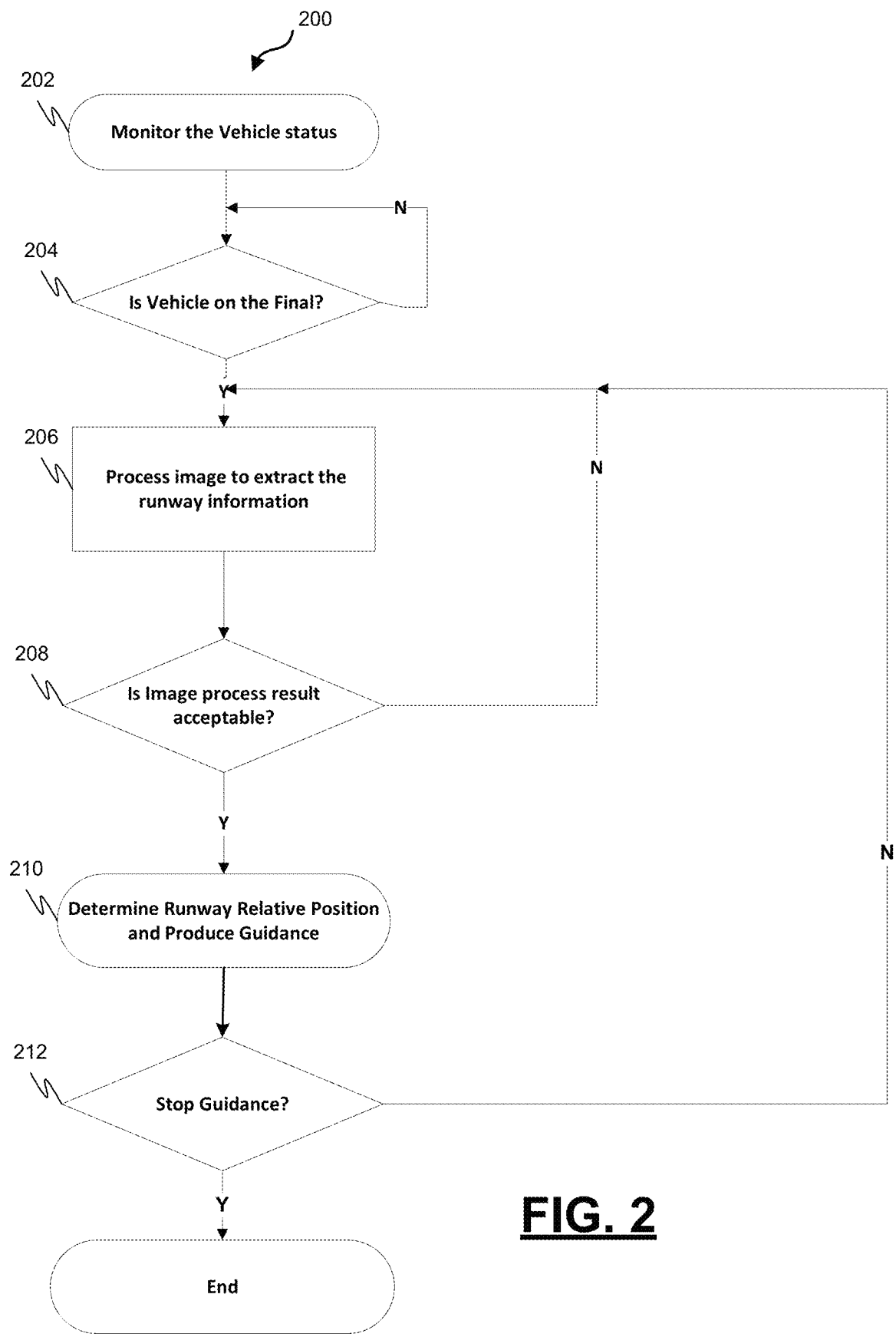
FIG. 2 is a process flow chart depicting an example process for providing visual and/or aural cues to an aerial vehicle operator during aerial vehicle landing operations to cue the vehicle operator to make course corrections to allow the aerial vehicle to land safely, in accordance with some embodiments.

FIG. 2 is a process flow chart depicting an example process 200 for providing visual and/or aural cues to an aerial vehicle operator during aerial vehicle landing operations to cue the vehicle operator to make course corrections to allow the aerial vehicle to land safely. The order of operation within the process 200 is not limited to the sequential execution as illustrated in the figure but may be performed in one or more varying orders as applicable and in accordance with the present disclosure.

The example process 200 includes monitoring vehicle status (operation 202) to determine if the vehicle is on final approach (decision 204) to the landing runway. The determination regarding whether the vehicle is on the final approach segment can be made based on aerial vehicle status information such as aerial vehicle position, altitude, speed, flight path angle, vehicle configuration status such as flap/landing gear status, runway information, and/or flight plan data from an onboard navigation system such as a Flight Management System (FMS). When it is determined that the vehicle is not on final approach (no, at decision 204), the example process includes continuing to monitor vehicle status.

When it is determined that the vehicle is on final approach (yes, at decision 204), wherein the goal is for the vehicle to stay aligned with the runway center line and fly a constant glide path angle with a constant approach speed, the example process 200 includes processing ground images to extract runway information (operation 206). The runway information can be used to identify the target lane for landing. Identifying the correct target lane is sought after because pilots, on occasion, accidently land aircraft on the wrong surface, such as landing on a parallel taxiway or a parallel runway. Similarly, a landing aid system may also face challenges with identifying the right runway to track, especially when there are parallel lanes (e.g., runways, taxiways) that are recognized in a ground image. Thus, the example visually-based landing aid system is configured to identify the lane that is the target to track using the extracted runway information.

The image processing could involve extracting lanes from ground images using known image processing techniques. For example, an image may be converted to grayscale to obtain the gradients in the image, which can be used to identify the edges of markings, lanes, and other objects. Then, background noise in the grayscale image (which could lead to recognizing incorrect shapes and failing to identify the markings and the runway) could be reduced by applying a Gaussian blur algorithm to remove excess noise information (e.g., the large lawn, parking lot and airport terminals at an airport can produce noise information on the image). Performing the greyscale conversion and applying the Gaussian blur algorithm may reduce/eliminate the noise information. At a final step in the image processing a Canny edge detector, which can be used to detect a wide range of edges in ground images, may be employed to detect and identify the markings and edges of a runway and/or taxiway. Alternatively or additionally, template matching, or OCR technology may be applied to identify the markings and edges of a runway and/or taxiway.

The image processing may also involve employing a voting algorithm to determine the target lane to track in the image. The voting algorithm may consider the defined target runway in the flight plan, the recognized image information, vehicle status such as the heading and position (if the position is available from other navigations source), and the destination (airport) configuration information, among other things. The destination (airport) configuration information could be stored in an onboard database which includes runway/taxiway information at the airport, such as the course, geometry (length and width), the position and the like of the runways and taxiways at the airport.

The example process 200 includes determining if the image processing result is acceptable (decision 208). If the image processing result is not acceptable (no, at decision 208), then further received ground images are processed to extract runway information (operation 206). If the image processing result is acceptable (yes, at decision 208), then the example process 200 advances to determining the vehicle's relative position to the runway and producing guidance based on the relative position (operation 210).

The example process 200 includes determining if further guidance is needed (decision 212). If no further guidance is needed (yes, at decision 212), for example when the vehicle has completed a landing, then the example process 200 ends. If further guidance is needed (no, at decision 212), then further received ground images are processed to extract runway information (operation 206).

Figure 3:
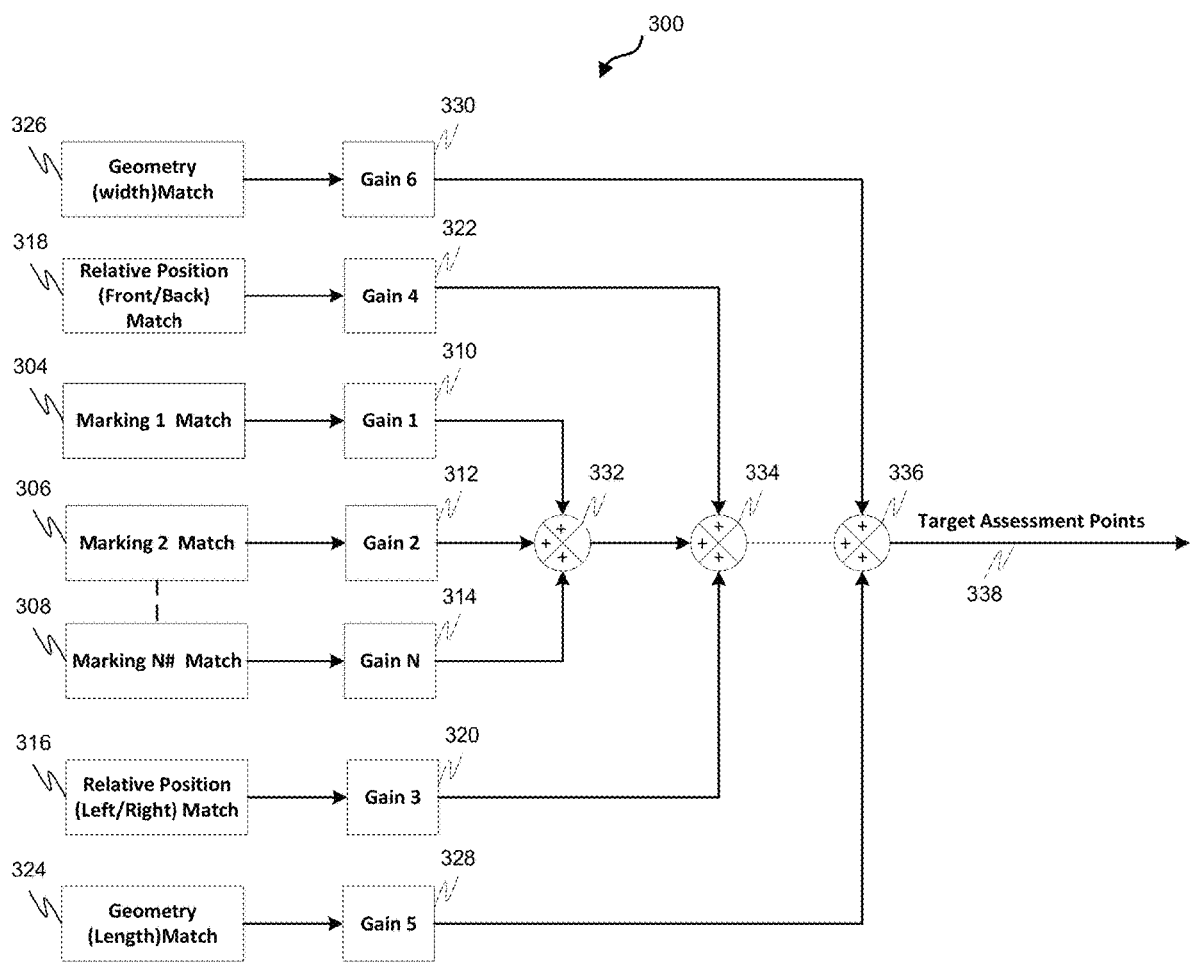
FIG. 3 is a block diagram depicting example blocks in a voting system that implements a voting algorithm to determine whether to track a lane identified in received ground images as a target landing zone, in accordance with some embodiments.

FIG. 3 is a block diagram depicting example blocks in a voting system 300 that implements a voting algorithm to determine whether to track a lane identified in received ground images as a target landing zone. The example voting system 300 considers several factors to determine whether to track an identified lane. The factors in the example voting system 300 include: recognition of one or more landing zone markings in the ground images, relative position of the identified lane in the ground images, and geometry of the identified lane in the ground images.

Regarding landing zone markings, a landing zone typically has noticeable markings and lights. As an example, a runway may have white edge markings (e.g., a first type of marking considered by the voting system), a white runway designator (e.g., a second type of marking), a dashed runway white center line (e.g., a third type of marking), a white runway threshold (e.g., a fourth type of marking), and white runway edge lights (e.g., a fifth type of marking). In contrast, a taxiway may have yellow markings with a continuous yellow solid line, a green center line, and blue edge lights. The example voting system 300 includes a marking match block (e.g., Marking 1 Match (304), Marking 2 Match (306), Marking N Match (308)) for each type of expected runway marking that indicates whether a match for its associated marking type was identified in the ground images. The example voting system 300 applies a Gain (e.g., Gain 1 (310), Gain 2 (312), and Gain N (314)) to each marking match block wherein the Gains may be weighted differently to allow the matching of certain types of markings to have a greater gain or weight, e.g., when determining whether an identified path is a target runway. As an example, if the target landing runway is RW 27, a recognized runway designator "27" in the image could have more weight than a recognized runway center line.

Regarding relative position, destination configuration data (e.g., for an airport) made available to a visually-based landing aid system may indicate the number of lanes (e.g., runways and taxiways) at the destination (e.g., airport), the relative position of these lanes based on the vehicle approaching direction, such as which lane is on the left, which lane is on the right, which lane is in the front, and which lane is at the back, and/or the relative position between the vehicle and the target runway when the vehicle position is known (e.g., from onboard navigation equipment). The example voting system 300 includes a relative position (left/right) match block 316 and a relative position (front/back) match block 318 that indicates whether a match for its associated relative position type was identified in the ground images. The example voting system 300 applies a Gain (e.g., Gain 3 (320), Gain 4 (322)) to each relative position match block wherein the Gains may be weighted differently to allow the matching of certain types of relative position to have a greater impact. As an example, matching the left/right relative position may have a higher gain/weight than the gain/weight applied for matching the front/back relative position.

Regarding relative geometry, the example voting system 300 does not need to match the exact geometry shape/size of the lanes in the image to exact width/length of the lanes. Instead, the example voting system 300 may make use of the relative length/width of the lanes. As an example, one lane at the destination may be longer or shorter than other lanes and one lane may be wider or narrower than other lanes. The example voting system 300 includes a relative geometry (length) match block 324 and a relative geometry (width) match block 326 that indicate whether the relative geometry for an identified lane matches an expected relative geometry. The example voting system 300 applies a Gain (e.g., Gain 5 (328), Gain 6 (330)) to each relative geometry match block wherein the Gains may be weighted differently to allow the matching of certain types of relative geometries to have a greater impact. As an example, matching the relative length may have a higher gain/weight applied than the gain/weight applied for matching the relative width. Also, these gains/weights could be adjusted based on different airport configurations. For example, an airport that has only one runway and one parallel taxiway (typical configuration for a small airport) could use different gains than an airport that has parallel runways.

In the example voting system 300, the value of the marking matches with their applied gains are summed at a first summer 332, the value of the relative position matches with their applied gains are summed at a second summer 334, and the value of the relative geometry matches with their applied gains are summed at a third summer 336. The summed value at the first summer 332 is added with the summed value at the second summer 334 which in turn is added to the summed value at the third summer 336 to generate target assessment points 338 for a lane in the image. If the target assessment points 338 for a lane are above a predetermined amount, then the lane can be declared a target runway.

Figure 4A:
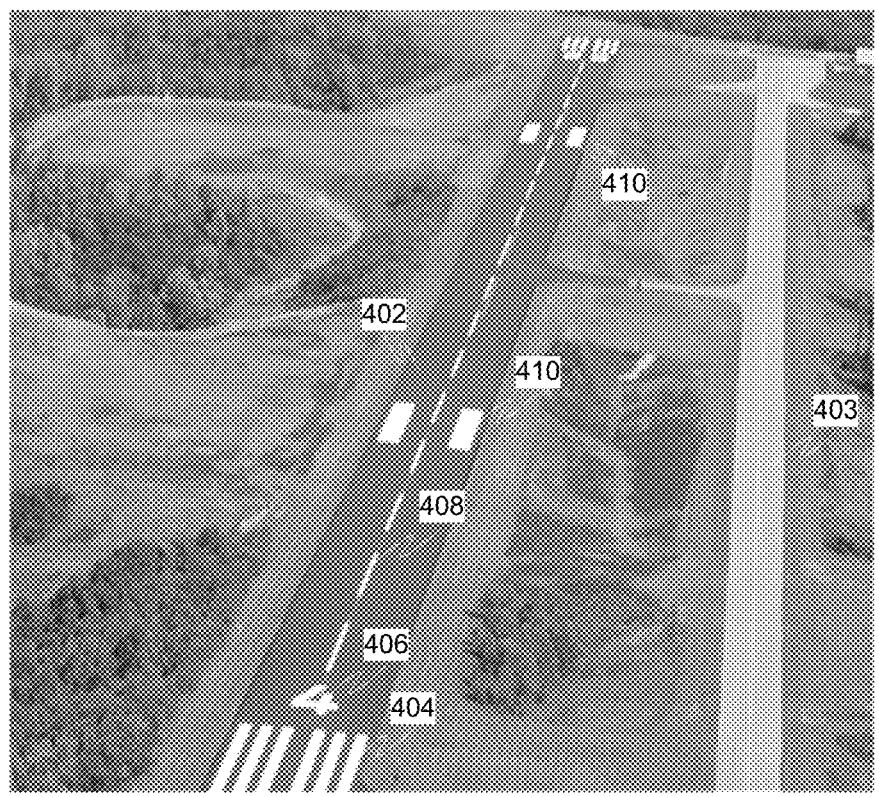
FIG. 4A is a diagram illustrating an image of an example runway when visibility is good, and a clear image is taken, in accordance with some embodiments.

FIG. 4A is a diagram illustrating an image of an example runway 402 when visibility is good, and a clear image is taken. Two lanes (the runway 402 and a parallel taxiway 403) are recognized. In this example, certain runway markings are identifiable from the image. White runway thresholds 404, a white runway designator 406, a dashed runway white center line 408, and white aiming point markings 410 are identifiable from the image. An example voting system may identify the runway 402 as the correct runway using a voting algorithm that gives weight to the runway thresholds 404, the white runway designator 406 (which matches an expected runway designator), the dashed runway white center line 408, the white aiming point markings 410, runway 402 being wider than taxiway 403, and runway 402 being to the left of taxiway 403. Recognition of the runway designator 403 may be given sufficient weight to make that factor dispositive.

Figure 4B:
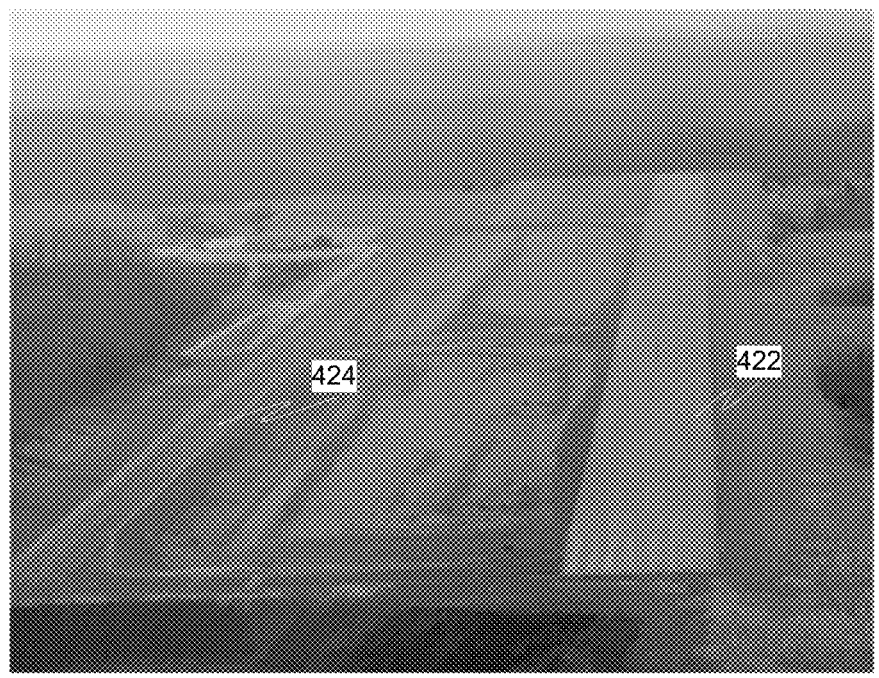
FIG. 4B is a diagram illustrating an image of an example runway when visibility is not good, and a clear image is not taken, in accordance with some embodiments.

FIG. 4B is a diagram illustrating an image of an example runway 422 when visibility is not good, and a clear image is not taken. In this example, runway markings cannot be distinguished accurately due to the factors such as the distance between the vehicle and the runway, low visibility, and the runway does not have clear markings. In this example, the airport has a parallel taxiway 423 located beside the runway 422, whose markings are not clearly distinguishable in the image. After the initial image processing, two lanes may be recognized in the image, the taxi way 423 on the left-hand side and the runway 422 on the right-hand side. An example voting system may identify the runway 422 as the correct runway using a voting algorithm that gives weight to the relative position and relative geometry of the runway 422. Based on airport information that identifies the airport as having a runway and a parallel taxiway, that the runway is on the right-hand side, and that the runway is wider and longer, and based on available GPS position data that indicates that the vehicle is closer to the runway than the taxiway, the example voting system can determine that the runway 422 is the target runway based on the weight given to the runway 422 being to the right of lane 423, is wider than lane 423, is longer than lane 423, and is closer to the vehicle. Runway 422 would get more points than lane 423 and would be determined as the target runway to track.

Manual overriding to select the target landing zone among the recognized lanes could also be allowed and has priority over the automatic selection. For example, there could be cases when the system failed to vote out the target landing zone or the operators decide to correct the voted landing zone.

Figure 5A:
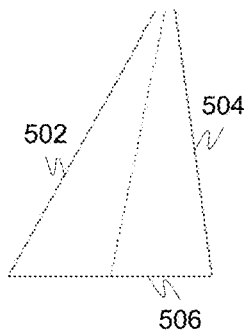
FIG. 5A is a diagram depicting an example runway with a recognized left side edge, right side edge, and front edge, but wherein a rear edge cannot be recognized, in accordance with some embodiments.
Figure 5B:
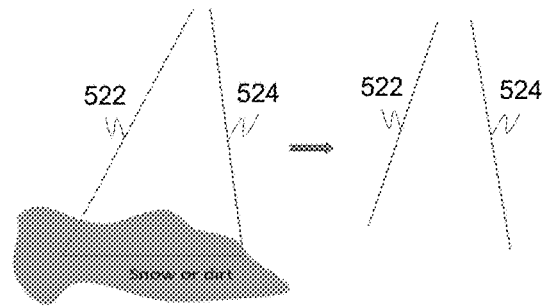
FIG. 5B is a diagram depicting an example runway with a recognized left side edge and right side edge, but wherein a front edge of the runway cannot be detected, in accordance with some embodiments.
Figure 5C:
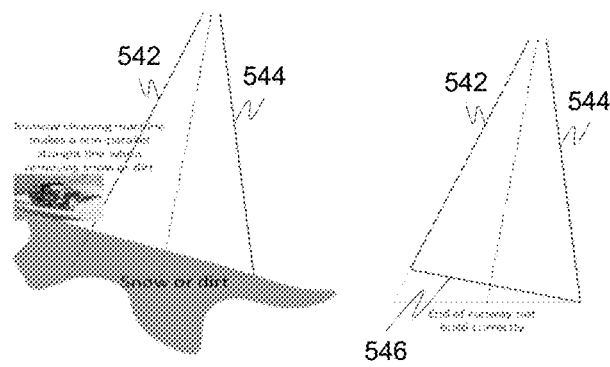
FIG. 5C is a diagram depicting an example runway with a recognized left side edge and right side edge, but wherein a misleading front edge of the runway is recognized in accordance with some embodiments.

In many instances more information may be needed from an image than is readily available. A well-recognized runway may be one where all 4 edges (left, right, front and rear) and/or the center line are all recognized. It could be understood that the left and right side of the runway have a significant feature/distance for the image processing algorithm to detect while the front/rear edge may not be detected accurately. FIGS. 5A, 5B, and 5C are diagrams illustrating the edges that an image processing algorithm may actually detect.

FIG. 5A is a diagram depicting an example runway 500 with a recognized left side edge 502, right side edge 504, and front edge 506, but wherein a rear edge cannot be recognized. Lack of recognition of a rear edge will have no impact on the visual aided guidance provided by an example visual aided landing system such as one described herein because the apparatus, systems, techniques, and articles provided herein do not need to detect the rear edge of the runway.

FIG. 5B is a diagram depicting an example runway 520 with a recognized left side edge 522 and right side edge 524, but wherein a front edge of the runway cannot be detected, for example, because it is covered by snow or dirt.

FIG. 5C is a diagram depicting an example runway 540 with a recognized left side edge 542 and right side edge 544, but wherein a misleading front edge of runway is recognized. For example, a runway cleaning machine can make a non-parallel straight line when removing snow or dirt, or a front edge of a runway may not be built correctly.

The apparatus, systems, techniques, and articles provided herein can estimate a front edge of the runway when the front edge of the runway cannot be detected or there is a misleading front edge. This can allow the apparatus, systems, techniques, and articles provided herein to provide visual aided guidance when the front edge of the runway cannot be detected or there is a misleading front edge Generally, recognizing a center line of a runway is not strict requirement since it may be calculated when the left and right sides are recognized. However, when the front edge is not recognized or there is a misleading front edge, special considerations may need to be taken.

One consideration is to utilize a predicted runway front edge, which may be calculated based on navigation data including vehicle position, runway location, heading and width. An intelligent algorithm, such as a data fusion algorithm, could then be used to merge the image data and the predicted runway front edge data. Knowledge of the location of the center line of a runway and the front edge of a runway may help to improve the reliability of the recognition result derived from the apparatus, systems, techniques, and articles provided herein, but neither of them is necessary for lateral guidance. Knowledge of the location of the front edge of a runway can be useful for vertical guidance.

If a front edge is recognized in the image data, a simple rule can be applied to determine if the recognized front edge is acceptable, and this may be done with only image data. If is determined that the recognized front edge is acceptable, then the next step is to determine guidance cues. If is determined that the recognized front edge is not acceptable, or it is originally not recognized, the next step will be to predict a new front edge of the runway and merge the image data and the predicted front edge data.

Figure 6:
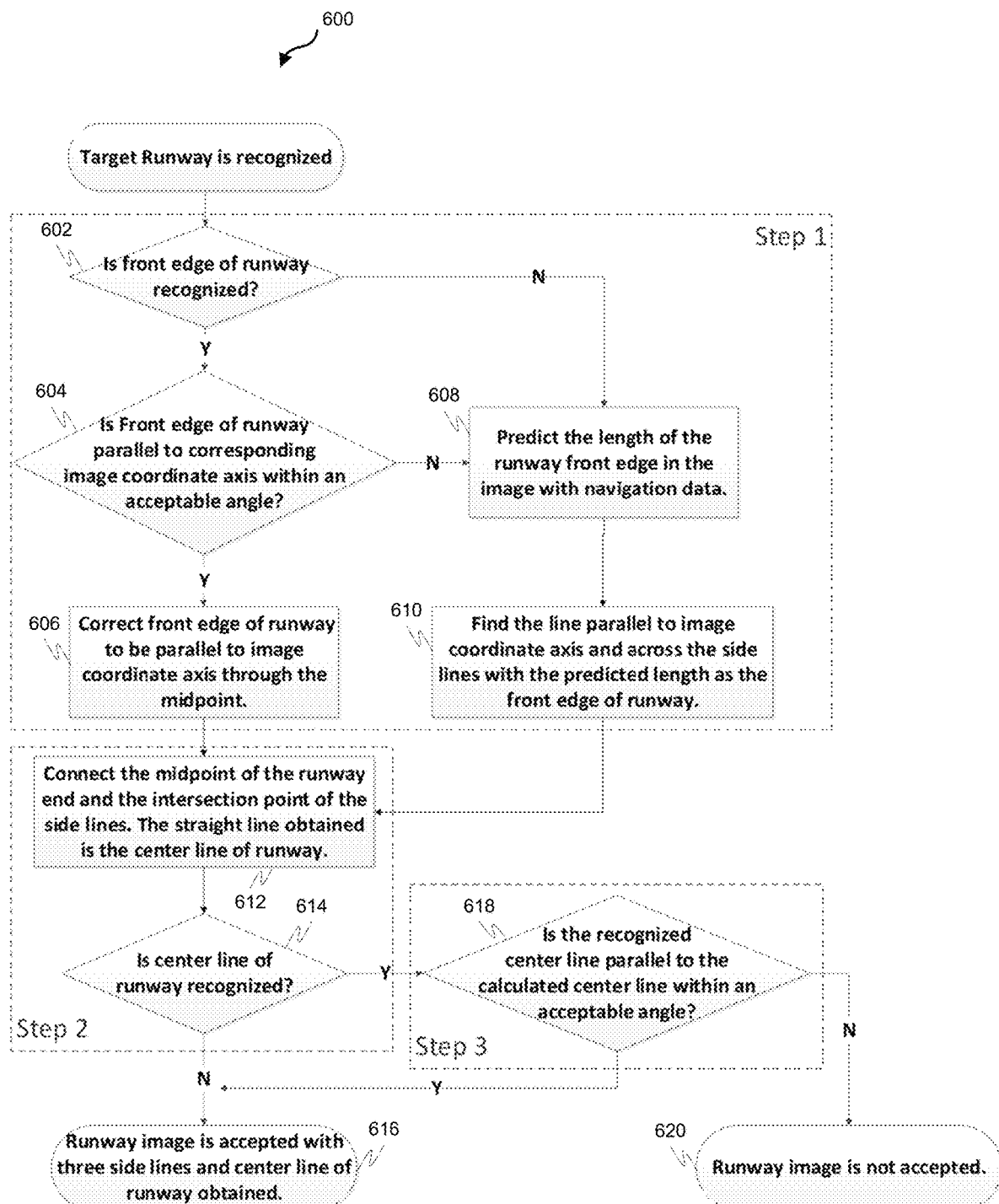
FIG. 6 is a process flow chart depicting an example process for obtaining a front runway edge and a center line for a target runway that has been recognized from image data, in accordance with some embodiments.

FIG. 6 is a process flow chart depicting an example process 600 for obtaining a front runway edge and a center line for a target runway that has been recognized from image data. The order of operation within the process 600 is not limited to the sequential execution as illustrated in the figure but may be performed in one or more varying orders as applicable and in accordance with the present disclosure. The following operations assume that the lateral axis of the camera from which the ground images are derived is parallel to the runway lateral axis.

The example process 600 includes determining the front edge of the runway (Step 1) recognized in the imaged data (an example verification is provided below in e.5). This is accomplished by determining if the front edge of the runway is recognized from the image (decision 602). If the front edge is recognized (yes, at decision 602), then it is determined if the front edge of the runway is parallel to a corresponding image coordinate axis within an acceptable angular tolerance (decision 604). If the front edge of the runway is parallel to a corresponding image coordinate axis within an acceptable angular tolerance (yes, at decision 604), then the example process 600 includes correcting the front edge of the runway to be parallel to the image axis through the midpoint (operation 606). If the front edge is not recognized (no, at decision 602) or if the front edge of the runway is not parallel to a corresponding image coordinate axis within an acceptable angular tolerance (no, at decision 604), then the example process 600 includes predicting the length of the runway front edge in the image using navigation data (operation 608) and finding, as the front edge of the runway, a line parallel to the image coordinate axis and across the side edges that has the predicted length (operation 610). The predicted length at the front edge in the image can be predicted using navigation data including aircraft position and pre-known information regarding runway location, heading and width.

The example process 600 includes calculating the center line of the runway (Step 2). This involves connecting the midpoint of the runway front edge and the intersection point of the side edges—the straight line obtained is the center line of runway (operation 612)—and also involves determining if a center line had been recognized from the image (decision 614). If no center line had been recognized (no, at decision 614), then the runway image is accepted with the recognized left and right side edges, the corrected or predicted front edge, and the determined center line (operation 616). If a center line had been recognized in the image (yes, at decision 614), then the process may proceed to Step 3 to determine the acceptance of the whole image.

The example process 600 includes determining the acceptance of the whole image (Step 3). This involves determining if the recognized center line is parallel to the calculated center line within an acceptable angular tolerance (decision 618). If the recognized center line is parallel to the calculated center line within an acceptable angular tolerance (yes, at decision 618), then the runway image is accepted with the recognized left and right side edges, the corrected or predicted front edge, and the determined center line (operation 616). If the recognized center line is not parallel to the calculated center line within an acceptable angular tolerance (no, at decision 618), then the runway image is not accepted (operation 620).

Figure 7A:
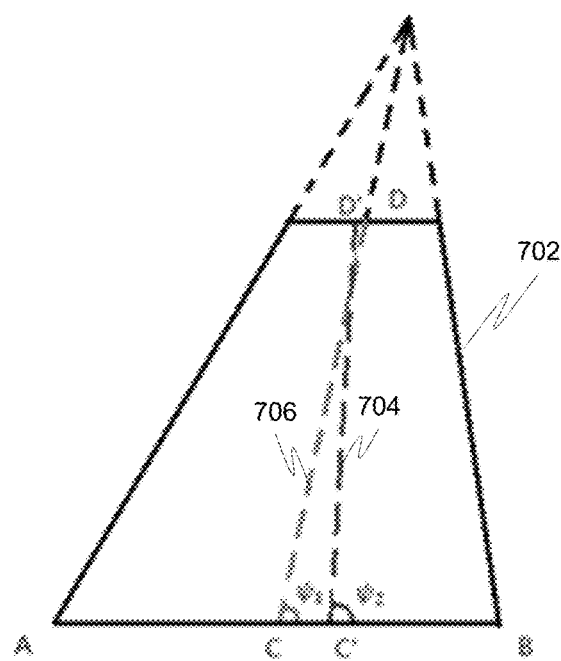
FIG. 7A is a diagram depicting an example runway, a recognized center line, and a calculated center line, in accordance with some embodiments.

FIG. 7A is a diagram depicting an example runway 702, a recognized center line 704, and a calculated center line 706. There may be a difference between the recognized center line 704 and the calculated center line 706 due to the accuracy of the image processing. The image is accepted if the difference between the recognized center line and the calculated center line is within an acceptable tolerance. In this example, the image processing result is accepted only when:

$$|\psi_1 - \psi_2| \leq \epsilon$$

where $\epsilon$ is a predefined parameter for determining whether the image processing accuracy is acceptable.

The apparatus, systems, techniques, and articles provided herein may apply a simple geometric rule to determine a vehicle's relative position with regard to the runway center line. In this example:

An aircraft is considered on the extended runway center line when $$\left| \frac{(\psi_1 + \psi_2)}{2} - 90° \right| \leq \varepsilon;$$

An Aircraft is to the right of the extended runway center line when $$\frac{(\psi_1 + \psi_2)}{2} < 90° - \varepsilon;$$

An Aircraft is to the left of the extended runway center line when $$\frac{(\psi_1 + \psi_2)}{2} > 90° + \varepsilon;$$

wherein $\psi_1$ is an angle in a ground image between the front edge and a calculated center line, $\psi_2$ is an angle in the ground image between the front edge and a recognized center line when the center is recognized, $\psi_2$ is set to $\psi_1$ when the center line is not recognized, and $\varepsilon$ is a predetermined parameter.

Figure 7B:
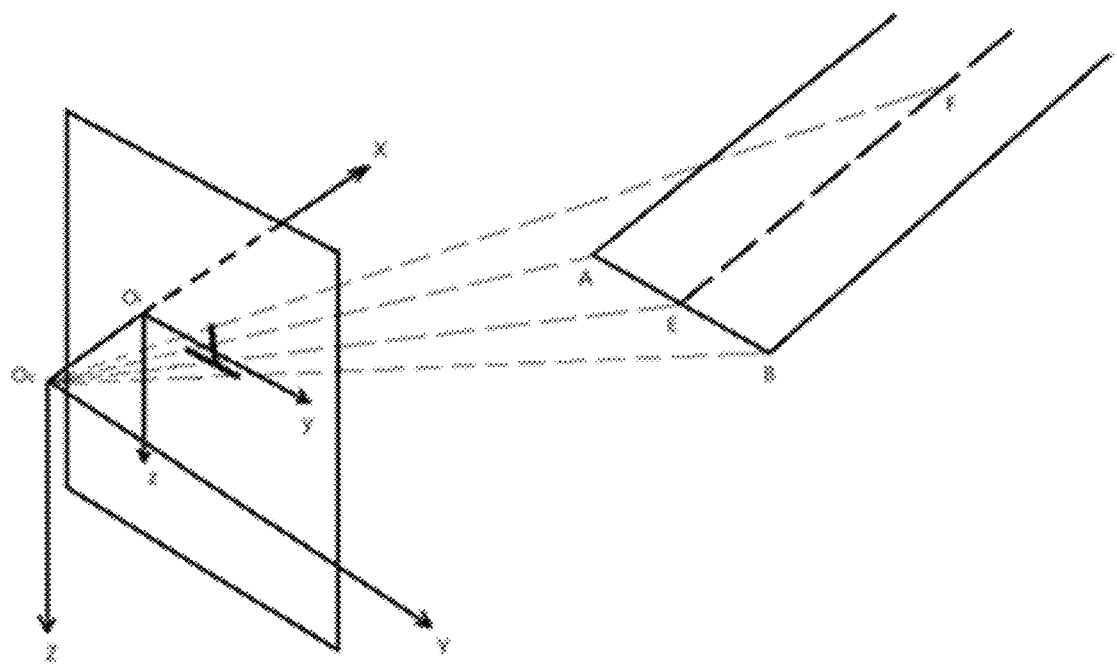
FIG. 7B is a diagram that can be used when providing an example proof of a justification for the use of a geometric rule to determine whether an aircraft is on, to the right of, or to the left of a runway center line, in accordance with some embodiments.

FIG. 7B is a diagram that can be used when providing an example proof of a justification for the use of the geometric rule to determine whether an aircraft is on, to the right of, or to the left of a runway center line.

Frame $O_c$ is camera coordinate system and frame $O_i$ is image coordinate system. AB is the base of runway, E is the middle point of AB, and F is a point on runway center line. When $\overrightarrow{O_cY}//\overrightarrow{AB}$ and $\overrightarrow{O_cX}//\overrightarrow{EF}$, the runway coordinates on a camera coordinate system can be stated as:

$$\begin{cases} A_{c_0}\left(X_{1_0}, -\frac{W}{2} - \Delta Y, Z_{1_0}\right) \\ B_{c_0}\left(X_{1_0}, \frac{W}{2} - \Delta Y, Z_{1_0}\right) \\ E_{c_0}(X_{3_0}, -\Delta Y, Z_{1_0}) \\ F_{c_0}(X_{4_0}, -\Delta Y, Z_{1_0}) \end{cases} \quad (e.1)$$

where W is the runway width, $\Delta Y$ is the offset of $\overrightarrow{O_cX}$ to $\overrightarrow{EF}$ and it is positive when $\overrightarrow{O_cX}$ is on the right of $\overrightarrow{EF}$. Although $X_{3_o}$ is equal to $X_{1_o}$, to support further extend demonstration when the base of runway is out of sight of camera, it is denoted differently here.

When rotating frame $O_c$ with respect to $\overrightarrow{O_cY}$ with the rotation angle $\theta = -\theta_c$, the rotation matrix would be:

$$R = \begin{bmatrix} \cos\theta_c & 0 & \sin\theta_c \\ 0 & 1 & 0 \\ -\sin\theta_c & 0 & \cos\theta_c \end{bmatrix}$$

Applying this rotation matrix, the runway coordinates in the new camera coordinate system would be:

$$\begin{cases} A_c\left(X_1, -\dfrac{W}{2} - \Delta Y, Z_1\right) \\ B_c\left(X_1, \dfrac{W}{2} - \Delta Y, Z_1\right) \\ E_c(X_3, -\Delta Y, Z_3) \\ F_c(X_4, -\Delta Y, Z_4) \end{cases} \quad (e.2)$$

where, $$\begin{cases} X_3 = X_{3_0}\cos\theta_c + Z_{1_0}\sin\theta_c \\ Z_3 = -X_{3_0}\sin\theta_c + Z_{1_0}\cos\theta_c \end{cases}$$

$$\begin{cases} X_4 = X_{4_0}\cos\theta_c + Z_{1_0}\sin\theta_c \\ Z_4 = -X_{4_0}\sin\theta_c + Z_{1_0}\cos\theta_c \end{cases}$$

Apply the relationship between image reference and camera reference, $$y = f\dfrac{Y}{X}, z = f\dfrac{Z}{X} \quad (f \text{ is focal length})$$

We can have the image coordinates and related vectors as follows:

$$A_i\begin{cases} y_1 = f\dfrac{-\dfrac{W}{2} - \Delta Y}{X_1} \\ z_1 = f\dfrac{Z_1}{X_1} \end{cases} B_i\begin{cases} y_2 = f\dfrac{\dfrac{W}{2} - \Delta Y}{X_1} \\ z_2 = f\dfrac{Z_1}{X_1} \end{cases} \quad (e.3)$$

$$E_i\begin{cases} y_3 = f\dfrac{-\Delta Y}{X_3} \\ z_3 = f\dfrac{Z_3}{X_3} \end{cases} F_i\begin{cases} y_4 = f\dfrac{-\Delta Y}{X_4} \\ z_4 = f\dfrac{Z_4}{X_4} \end{cases} \quad (e.4)$$

$$\overrightarrow{AB} = \left(f\dfrac{W}{X_1}, 0\right) \quad (e.5)$$

$$\overrightarrow{EF} = \left(f\dfrac{X_4\Delta Y - X_3\Delta Y}{X_3 X_4}, f\dfrac{X_3 Z_4 - X_4 Z_3}{X_3 X_4}\right)$$

From e.5 above, we have that the end of runway $\overrightarrow{AB}$ is parallel to the y axis of the image coordinate system, thus, the angle is calculated as below, $$\psi = \arctan\dfrac{-z}{y}, \quad (1)$$

$$\dfrac{-z}{y} = \dfrac{X_4 Z_3 - X_3 Z_4}{X_3 X_4} \times \dfrac{X_3 X_4}{(X_4 - X_3)\Delta Y} = \dfrac{X_4 Z_3 - X_3 Z_4}{(X_4 - X_3)\Delta Y}$$

$$= \dfrac{(X_{4_0}\cos\theta_c + Z_{1_0}\sin\theta_c)(-X_{3_0}\sin\theta_c + Z_{1_0}\cos\theta_c) - (X_{3_0}\cos\theta_c + Z_{1_0}\sin\theta_c)(-X_{4_0}\sin\theta_c + Z_{1_0}\cos\theta_c)}{[(X_{4_0}\cos\theta_c + Z_{1_0}\sin\theta_c) - (X_{3_0}\cos\theta_c + Z_{1_0}\sin\theta_c)]\Delta Y}$$

$$= \dfrac{X_{4_0}Z_{1_0}(\sin^2\theta_c + \cos^2\theta_c) - X_{3_0}Z_{1_0}(\sin^2\theta_c + \cos^2\theta_c)}{(X_{4_0} - X_{3_0})\cos\theta_c \Delta Y}$$

$$= \dfrac{Z_{1_0}}{\Delta Y \cos\theta_c}$$

thus, $\psi = \arctan\dfrac{Z_{1_0}}{\Delta Y \cos\theta_c}$

Therefore,

1) $\psi = 90°$ when $\Delta Y = 0$ which represents aircraft is on the runway center line.
2) $\psi < 90°$ when $\Delta Y > 0$ which represents aircraft is on the right of runway center line.
3) $\psi > 90°$ when $\Delta Y < 0$ which represents aircraft is on the left of runway center line.

Figure 8A:
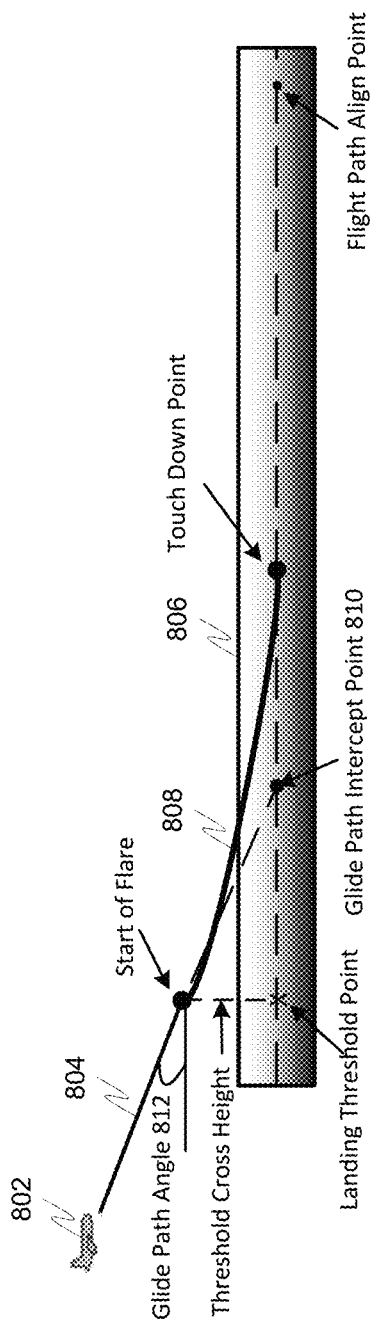
FIGS. 8A and 8B are diagrams illustrating a final approach/landing procedure for a fixed wing vehicle, in accordance with some embodiments.
Figure 8B:
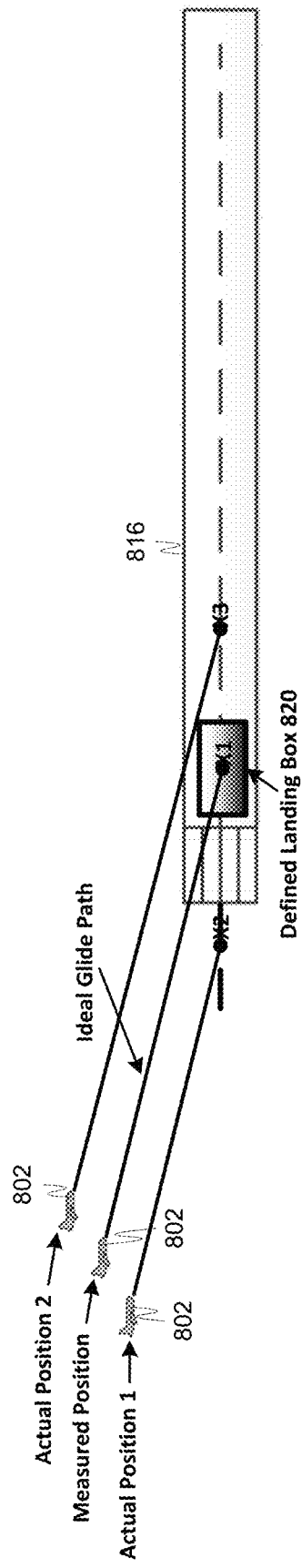

FIGS. 8A and 8B are diagrams illustrating a final approach/landing procedure for a fixed wing vehicle 802. In the example of FIG. 8A, the vehicle 802 is flying a constant glide path 804 (for example 3 degrees) to approach the runway 806, and then initiates a flare maneuver 808 at a certain foot (for example 20 feet) above the runway threshold to reduce the sink rate to touch down. A stable glide path is important for a successful landing, and when pilots manually fly the final approach, the glide path intercept ground point 810 can be used as a visual aimed point to judge if the aircraft is flying the right glide path.

When the approach and landing is automatically controlled by an onboard Auto-Flight Control System (AFCS). The AFCS will try to control the vehicle's measured position (the measured position could be provided by navigation system/sensors like GPS) to stay on a defined glide path 804 (a glide path 804 is defined by a glide path angle 812 and the glide path intercept point 810) to the runway 806. As illustrated in FIG. 8B, there can be navigation error between a measured position and an actual position (e.g., "Actual Position 1" or "Actual Position 2"), and the error could result in the vehicle 802 landing outside an expected landing box 820.

The visually-based landing aid system could detect when the vehicle is on the final approach segment, analyze the taken ground images and determine if the vehicle is on the correct glide path without depending on position estimates from other onboard navigation systems/sensors.

An example visually-based landing aid system is configured to define an expected landing box 820 in the runway 816. When an aimed point X1 is inside the box 820, the example visually-based landing aid system could determine that the vehicle 802 is on the right glide path, will touch down inside the expected landing zone, and will not cause a runway overrun, based on the vehicle's flare trajectory and its deceleration capability. When the aimed point is not inside the box 820, it indicates that there is a risk that the vehicle will touch down outside of the landing zone, and an under-shoot (at point X2) or an overshoot (at point X3) of the landing zone will occur. In such a situation, the example visually-based landing aid system could then provide alerting or/and correction cues to the vehicle operator to take corrective actions. Regardless of whether the vehicle is flying manually or automatically, the visually-based landing aid system could determine if the vehicle is flying on the right glide path independently and provide indications/alerting/correction cues to the operators to take corrective actions when the vehicle is deviating from a defined glide path.

Figure 9:
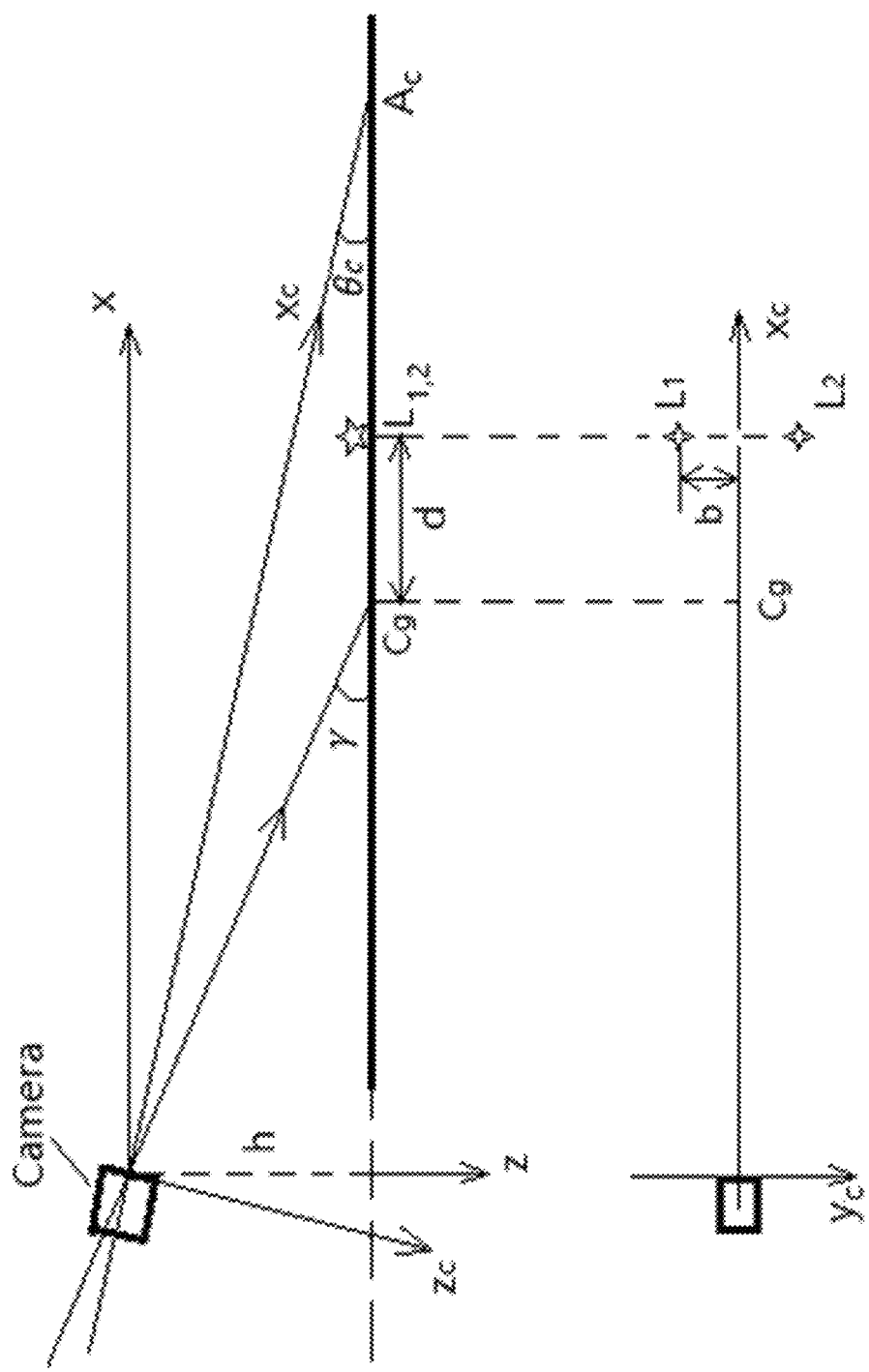
FIGS. 9 and 10 illustrate example lines and angles with respect to a vehicle and a target runway that can be used to provide an example proof of how the example visually-based landing aid system can provide indications/alerting/correction cues to vehicle operators to take corrective action when the vehicle is deviating from a defined glide path, in accordance with some embodiments.
Figure 10:
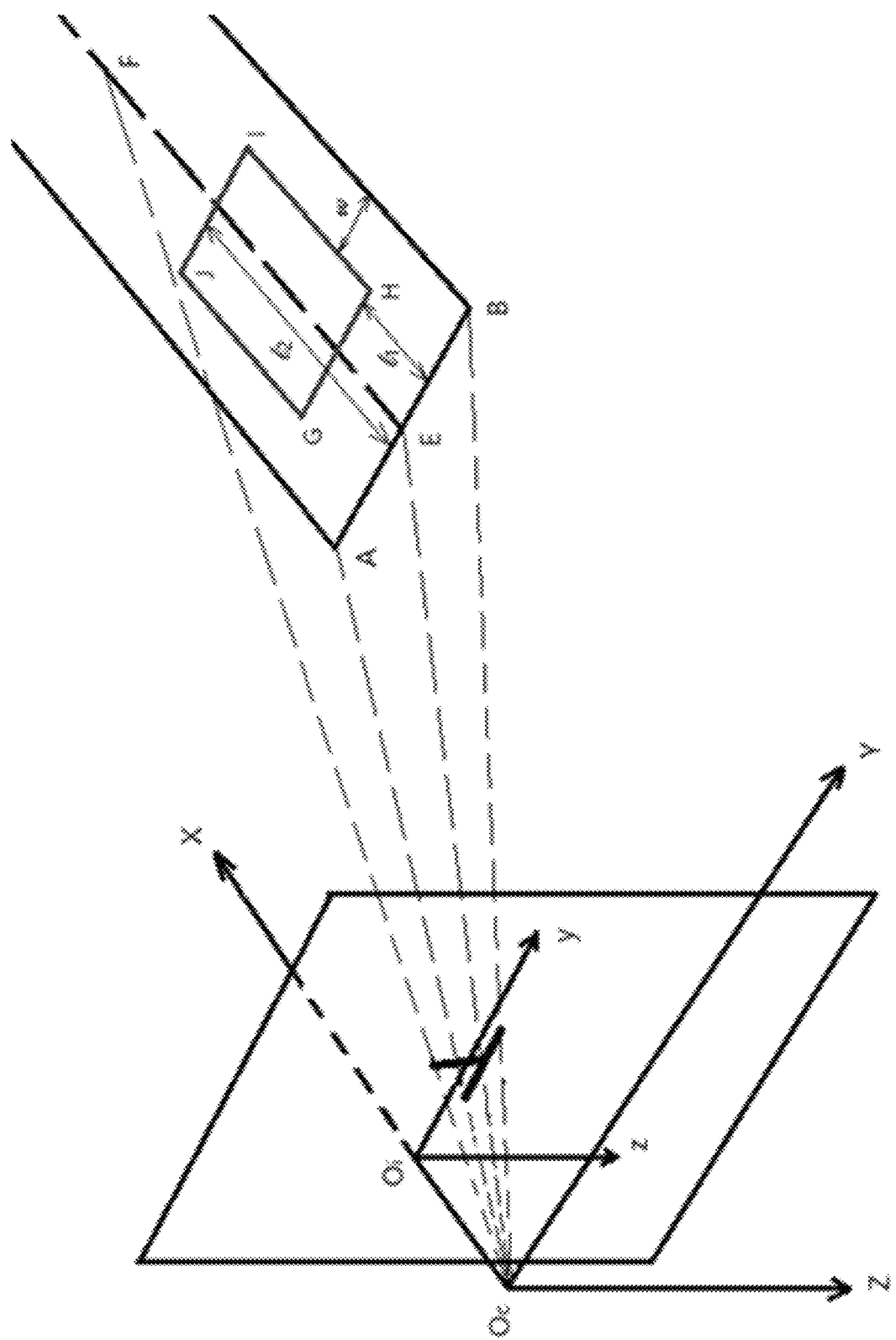

FIGS. 9 and 10 illustrate example lines and angles with respect to a vehicle and a target runway that can be used to provide an example proof of how the example visually-based landing aid system can provide indications/alerting/correction cues to vehicle operators to take corrective action when the vehicle is deviating from a defined glide path. In this example, frame $O_c$ is denoted as the camera coordinate system and frame $O_i$ is denoted as the image coordinate system. As shown in FIG. 9, Ac is the aiming point of the camera on ground, $\gamma$ is the flight path angle, $C_g$ is the aiming point of aircraft CG point, L1 and L2 are the predicted landing points of the left and right main landing wheels, d is the distance between $C_g$ and L1,2 in x direction, b is the distance between A and L1,2 in y direction, where d and b can be obtained from aircraft geometry structure.

Similar to (e.1) to (e.2), we have:

$$\begin{cases} Ac_{c_0}\left(\dfrac{h}{\tan\theta_c}, 0, h\right) \\ L1_{c_0}\left(\dfrac{h}{\tan\gamma} + d, -b, h\right) \\ L2_{c_0}\left(\dfrac{h}{\tan\gamma} + d, b, h\right) \end{cases}$$

$$=> \begin{cases} Ac_c\left(\dfrac{h}{\sin\theta_c}, 0, 0\right) \\ L1_c(X_{L1}, -b, Z_{L1}) \\ L2_c(X_{L2}, b, Z_{L2}) \end{cases}$$

where $\begin{cases} X_{L1} = X_{L2} = \left(\dfrac{h}{\tan\gamma} + d\right)\cos\theta_c + h\sin\theta_c \\ Z_{L1} = Z_{L2} = -\left(\dfrac{h}{\tan\gamma} + d\right)\sin\theta_c + h\cos\theta_c \end{cases}$ So, in the 2-D image coordinate system, we have $$Ac_i\begin{cases} y_{Ac} = f\dfrac{Y}{X} = 0 \\ z_{Ac} = f\dfrac{Z}{X} = 0 \end{cases}$$

$$L1_i\begin{cases} y_{L1} = f\dfrac{Y}{X} = -f\dfrac{b}{(h/\tan\gamma + d)\cos\theta_c + h\sin\theta_c} \\ Z_{L1} = f\dfrac{Z}{X} = f\dfrac{-(h/\tan\gamma + d)\sin\theta_c + h\cos\theta_c}{(h/\tan\gamma + d)\cos\theta_c + h\sin\theta_c} \end{cases} \quad (e.6)$$

$$L2_i\begin{cases} y_{L2} = f\dfrac{Y}{X} = -y_{L1} \\ z_{L2} = f\dfrac{Z}{X} = z_{L1} \end{cases} \quad (e.7)$$

Notice:
1) $Ac_i(0,0)$ represents the middle point of the 2-D image.
2) "d" can also include the predicted distance considering flare maneuver when the flare trajectory is predictable.
3) $\theta_c$ can be calculated from pitch angle of the aircraft and the setting angle of the camera.

As is show in FIG. 10, GHIJ is the expected landing zone box.
Based on (e.1), we have:

$$\begin{cases} G_{c_0}(X_{1_0} + l_1, Y_{1_0} + \omega, Z_{1_0}) \\ H_{c_0}(X_{1_0} + l_1, Y_{2_0} - \omega, Z_{1_0}) \\ I_{c_0}(X_{1_0} + l_2, Y_{1_0} + \omega, Z_{1_0}) \\ J_{c_0}(X_{1_0} + l_2, Y_{2_0} - \omega, Z_{1_0}) \end{cases}$$

Combined with (e.2), we have:

$$\begin{cases} G_c(X_1 + l_1\cos\theta_c, Y_1 + \omega, Z_1 - l_1\sin\theta_c) \\ H_c(X_1 + l_1\cos\theta_c, Y_2 - \omega, Z_1 - l_1\sin\theta_c) \\ I_c(X_1 + l_2\cos\theta_c, Y_1 + \omega, Z_1 - l_2\sin\theta_c) \\ J_c(X_1 + l_2\cos\theta_c, Y_2 - \omega, Z_1 - l_2\sin\theta_c) \end{cases} \quad (e.8)$$

To obtain the coordinates of G, H, I, and J points in image coordinate system, we need to calculate the unknown parameters in (e.8): $X_1$, $Y_1$, $Y_2$, and $Z_1$ through the recognized runway information in the 2-D image.

With runway being recognized in the 2-D image, we can obtain the coordinates of point A and point B in the image coordinate system, that is, $A_i(y_1, z_1)$ and $B_i(y_2, z_2)$.

Per (e.3), it is expected that $z_2 = z_1$, so $\overrightarrow{AB} = (y_2 - y_1, 0)$. Combined with (e.5), we can have:

$$X_1 = f\dfrac{W}{y_2 - y_1}$$

So, we can further have:

$$Y_1 = \dfrac{X_1 y_1}{f} = \dfrac{W y_1}{y_2 - y_1}$$

$$Y_2 = \dfrac{X_1 y_2}{f} = \dfrac{W y_2}{y_2 - y_1}$$

$$Z_1 = \dfrac{X_1 z_1}{f} = \dfrac{W z_1}{y_2 - y_1}$$

With $X_1$, $Y_1$, $Y_2$, and $Z_1$ in (e.8) calculated, we can obtain the coordinates of G, H, I, and J points in image coordinate system as following:

$$G_i\begin{cases} y_G = f\dfrac{Y_1 + \omega}{X_1 + l_1\cos\theta_c} \\ z_G = f\dfrac{Z_1 - l_1\sin\theta_c}{X_1 + l_1\cos\theta_c} \end{cases} H_i\begin{cases} y_H = f\dfrac{Y_2 - \omega}{X_1 + l_1\cos\theta_c} \\ z_H = z_G \end{cases} \quad (e.9)$$

$$I_i\begin{cases} y_I = f\dfrac{Y_1 + \omega}{X_1 + l_2\cos\theta_c} \\ z_I = f\dfrac{Z_1 - l_2\sin\theta_c}{X_1 + l_2\cos\theta_c} \end{cases} J_i\begin{cases} y_J = f\dfrac{Y_2 - \omega}{X_1 + l_2\cos\theta_c} \\ z_J = z_I \end{cases} \quad (e.10)$$

where, $\begin{cases} X_1 = \dfrac{fW}{y_2 - y_1} \\ Y_1 = \dfrac{W y_1}{y_2 - y_1} \\ Y_2 = \dfrac{W y_2}{y_2 - y_1} \\ Z_1 = \dfrac{W z_1}{y_2 - y_1} \end{cases}$ So, the system can mark the points L1 and L2 with the coordinates $(\mp y_L, z_L)$ on the captured image. Then, comparing the recognized runway and the two points on the image, it can be determined that if the vehicle will land inside the target landing zone or not.

The disclosed algorithm assumed that lateral axis of aircraft body (camera) is parallel to the runway lateral axis when taking an image, during the landing operation, the heading of the vehicle may not be parallel to runway center line due to the factors like cross wind. If the camera is fixed with respect to the aircraft body, the algorithm of image processing to determine the aircraft relative position needs be adjusted. A feasible solution is to enable one rotation degree of the camera with respect to the aircraft body so that the camera can rotate a certain angle to align its sight line to the runway center line. With such solution, the guidance can be provided when aircraft maintains a stable track after the correction maneuver. If one more rotation degree of the camera is enabled, the guidance can be provided continuously even when the vehicle is in correcting maneuver. Those rotation angles can be calculated per the attitude of the aircraft and the runway heading.

Figure 11:
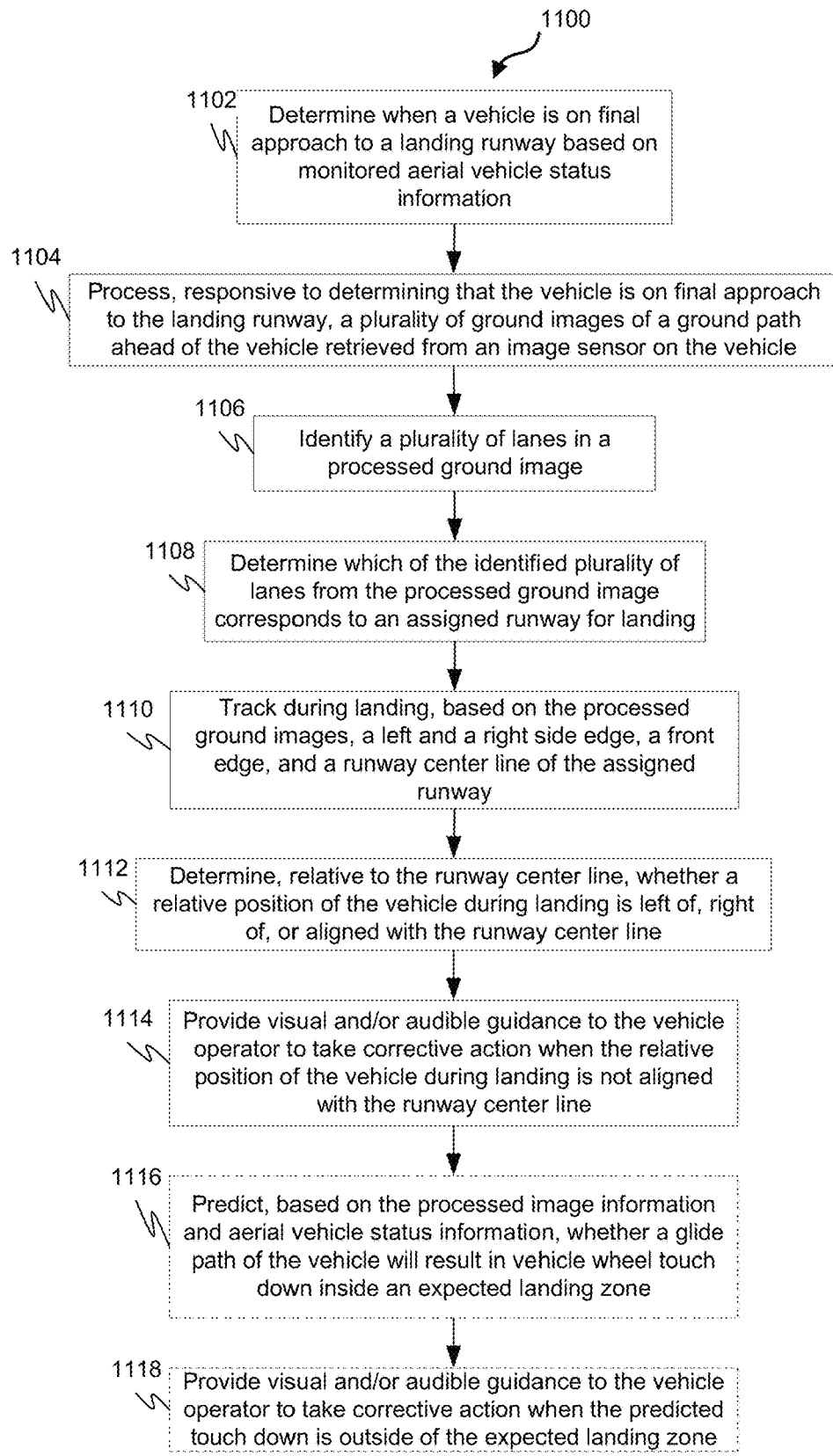
FIG. 11 is a process flow chart depicting an example process for providing visual cues to an aerial vehicle operator, in accordance with some embodiments.

FIG. 11 is a process flow chart depicting an example process 1100 for providing visual cues to an aerial vehicle operator. The order of operation within the process 1100 is not limited to the sequential execution as illustrated in the figure but may be performed in one or more varying orders as applicable and in accordance with the present disclosure.

The example process 1100 includes determining when a vehicle is on final approach to a landing runway based on monitored aerial vehicle status information (operation 1102).

The example process 1100 includes processing, responsive to determining that the vehicle is on final approach to the landing runway, a plurality of ground images of a ground path ahead of the vehicle retrieved from an image sensor on the vehicle (operation 1104).

The example process 1100 includes identifying a plurality of lanes in a processed ground image (operation 1106) and determining which of the identified plurality of lanes from the processed ground image corresponds to an assigned runway for landing (operation 1108). Identifying lanes in a processed ground image may include applying greyscale conversion and a Gaussian blur algorithm to reduce noise; and performing edge detection using a Canny edge detector, template matching, or OCR (optical character recognition) technology. Determining which of the identified plurality of lanes from the processed ground image corresponds to an assigned runway for landing may be made based on a relative position of one lane relative to another lane in the ground image or a relative geometry of one lane relative to another lane in the ground images when landing zone markings are not recognized in the ground image or recognized landing zone markings in the ground image are not sufficient to determine which of the identified plurality of lanes is the assigned runway. Determining the identified lane from the processed ground image that corresponds to an assigned runway for landing may include applying a voting algorithm to the identified plurality of lanes to determine which identified lane from the processed ground image corresponds to an assigned runway for landing, wherein the voting algorithm weighs, for each lane, data from the processed ground image regarding recognized landing zone markings on the lane if available, a relative position of the lane based on destination configuration data, and a relative geometry of the lane, wherein the lane with the highest score is determined to be the assigned runway.

The example process 1100 includes tracking during landing, based on the processed ground images, a left and a right side edge, a front edge, and a runway center line of the assigned runway (operation 1110). Tracking during landing a left and a right side edge, a front edge, and a runway center line of the assigned runway may include: determining the front edge by correcting a recognized front edge of the assigned runway, which was recognized in the ground images, to be parallel to the image coordinate axis of the image sensor; or predicting the length of the front edge of the assigned runway in a ground image using navigation data and finding, as the front edge of the assigned runway, a line parallel to the image coordinate axis and across the left and right side edges that has the predicted length. Tracking during landing a left and a right side edge, a front edge, and a runway center line of the assigned runway may further include calculating the runway center line by connecting the midpoint of the runway front edge and the intersection point of the left and right side edges.

The example process 1100 includes determining, relative to the runway center line, whether a relative position of the vehicle during landing is left of, right of, or aligned with the runway center line (operation 1112). Determining whether a relative position of the vehicle during landing is left of, right of, or aligned with the runway center line may include determining the relative position based on an error measurement between an obtained center line and a perpendicular line. Determining whether a relative position of the vehicle during landing is left of, right of, or aligned with the runway center line may further include: determining that the aircraft is on an extended runway center line when $$\left| \frac{(\psi_1 + \psi_2)}{2} - 90° \right| \leq \varepsilon;$$

determining that the aircraft is to the right of the extended runway center line when $$\frac{(\psi_1 + \psi_2)}{2} < 90° + \varepsilon;$$

and determining that the aircraft is to the left of the extended runway center line when $$\frac{(\psi_1 + \psi_2)}{2} > 90° + \varepsilon;$$

wherein $\psi_1$ all angle in a ground image between the front edge and a calculated center line, $\psi_2$ is an angle in the ground image between the front edge and a recognized center line when the center line is recognized and is set to $\psi_1$ when the center line is not recognized, and $\varepsilon$ is a predetermined parameter.

The example process 1100 includes providing visual and/or audible guidance to the vehicle operator to take corrective action when the relative position of the vehicle during landing is not aligned with the runway center line (operation 1114).

The example process 1100 may optionally include predicting, based on the processed image information and aerial vehicle status information, whether a glide path of the vehicle will result in vehicle wheel touch down inside an expected landing zone (operation 1116). Predicting whether the glide path of the vehicle will result in vehicle wheel touch down inside the expected landing zone may include defining an expected landing block; and determining if a vehicle aim point is inside the landing block based on vehicle flare trajectory and deceleration capability.

The example process 1100 may optionally include providing visual and/or audible guidance to the vehicle operator to take corrective action when the predicted touch down is outside of the expected landing zone (operation 1118).

Described herein are apparatus, systems, techniques, and articles for providing a unique and low cost visual aided approach and landing system for an aerial vehicle that is configured to analyze ground images, identify a target runway to track, monitor and determine the vehicle's relative position with regard to the target runway and a predetermined approach/landing path, and provide indications/alerting to the pilots/operators of the vehicle to aid with landing operations of the vehicle.

In one embodiment, a system for providing visual cues to an aerial vehicle operator is disclosed. The system comprises a controller configured to: determine when a vehicle is on final approach to a landing runway based on monitored aerial vehicle status information; process, responsive to determining that the vehicle is on final approach to the landing runway, a plurality of ground images of a ground path ahead of the vehicle retrieved from an image sensor on the vehicle; identify a lane in the processed ground images; determine whether the identified lane from the processed ground images corresponds to an assigned runway for landing based on a relative position of the identified lane relative to another lane in the ground images or a relative geometry of the identified lane relative to another lane in the ground images when landing zone markings are not recognized in the ground images or recognized landing zone markings in the ground images are not sufficient to determine that the identified lane is the assigned runway; track during landing, based on the processed ground images, a left and a right side edge, a front edge, and a runway center line of the assigned runway; determine, relative to the runway center line, whether a relative position of the vehicle during landing is left of, right of, or aligned with the runway center line; and provide visual and/or audible guidance to the vehicle operator to take corrective action when the relative position of the vehicle during landing is not aligned with the runway center line.

These aspects and other embodiments may include one or more of the following features. The controller may be further configured to: predict, based on the processed image information and aerial vehicle status information, whether a glide path of the vehicle will result in vehicle wheel touch down inside an expected landing zone; and provide visual and/or audible guidance (alerting or/and correction cues) to the vehicle operator to take corrective action when the predicted touch down is outside of the expected landing zone (resulting in an under-shoot or an overshoot of the assigned runway). To predict whether the glide path of the vehicle will result in vehicle wheel touch down inside the expected landing zone the controller is configured to: define an expected landing block; and determine if a vehicle aim point is inside the landing block based on vehicle flare trajectory and deceleration capability. To identify a lane in the processed ground images, the controller is configured to apply greyscale conversion and a Gaussian blur algorithm to reduce noise. To identify a lane in the processed ground images, the controller is configured to perform edge detection using a Canny edge detector, template matching, or OCR (optical character recognition) technology. To determine whether the identified lane from the processed ground images corresponds to an assigned runway for landing the controller is configured to apply a voting algorithm to determine whether the identified lane from the processed ground images corresponds to an assigned runway for landing, wherein the voting algorithm weighs data from the processed ground images regarding recognized landing zone markings of the identified lane if available, a relative position of the identified lane based on destination configuration data, and a relative geometry of the identified lane. To track during landing a left and a right side edge, a front edge, and a runway center line of the assigned runway, the controller is configured to: determine the front edge by correcting a recognized front edge of the assigned runway, which was recognized in the ground images, to be parallel to the image coordinate axis of the image sensor; or predict the length of the front edge of the assigned runway in a ground image using navigation data and find, as the front edge of the assigned runway, a line parallel to the image coordinate axis and across the left and right side edges that has the predicted length. To track during landing a left and a right side edge, a front edge, and a runway center line of the assigned runway, the controller is configured to calculate the runway center line by connecting the midpoint of the runway front edge and the intersection point of the left and right side edges. To determine whether a relative position of the vehicle during landing is left of, right of, or aligned with the runway center line the controller is configured to determine the relative position based on an error measurement between an obtained center line and a perpendicular line. To determine whether a relative position of the vehicle during landing is left of, right of, or aligned with the runway center line the controller is further configured to: determine that the aircraft is on an extended runway center line when $$\left|\frac{(\psi_1 + \psi_2)}{2} - 90°\right| \le \varepsilon;$$

determine that the aircraft is to the right of the extended runway center line when $$\frac{(\psi_1 + \psi_2)}{2} < 90° - \varepsilon;$$

and determine that the aircraft is to the left of the extended runway center line when $$\frac{(\psi_1 + \psi_2)}{2} > 90° + \varepsilon;$$

wherein $\psi_1$ is an angle in a ground image between the front edge and a calculated center line, $\psi_2$ is an angle in the ground image between the front edge and a recognized center line when the center line is recognized and is set to $\psi_1$ when the center line is not recognized, and $\varepsilon$ is a predetermined parameter.

In another embodiment, a processor-implemented method for providing visual cues to an aerial vehicle operator is disclosed. The method comprises: determining when a vehicle is on final approach to a landing runway based on monitored aerial vehicle status information; processing, responsive to determining that the vehicle is on final approach to the landing runway, a plurality of ground images of a ground path ahead of the vehicle retrieved from an image sensor on the vehicle; identifying a lane in the processed ground images; determining whether the identified lane from the processed ground images corresponds to an assigned runway for landing based on a relative position of the identified lane relative to another lane in the ground images or a relative geometry of the identified lane relative to another lane in the ground images when landing zone markings are not recognized in the ground images or recognized landing zone markings in the ground images are not sufficient to determine that the identified lane is the assigned runway; tracking during landing, based on the processed ground images, a left and a right side edge, a front edge, and a runway center line of the assigned runway; determining, relative to the runway center line, whether a relative position of the vehicle during landing is left of, right of, or aligned with the runway center line; and providing visual and/or audible guidance to the vehicle operator to take corrective action when the relative position of the vehicle during landing is not aligned with the runway center line.

These aspects and other embodiments may include one or more of the following features. The method may further comprise: predicting, based on the processed image information and aerial vehicle status information, whether a glide path of the vehicle will result in vehicle wheel touch down inside an expected landing zone; and providing visual and/or audible guidance to the vehicle operator to take corrective action when the predicted touch down is outside of the expected landing zone. The predicting whether the glide path of the vehicle will result in vehicle wheel touch down inside the expected landing zone may comprises defining an expected landing block; and determining if a vehicle aim point is inside the landing block based on vehicle flare trajectory and deceleration capability. The identifying a lane in the processed ground images may comprise: applying greyscale conversion and a Gaussian blur algorithm to reduce noise; and performing edge detection using a Canny edge detector, template matching, or OCR (optical character recognition) technology. The determining whether the identified lane from the processed ground images corresponds to an assigned runway for landing may comprise applying a voting algorithm to determine whether the identified lane from the processed ground images corresponds to an assigned runway for landing, wherein the voting algorithm weighs data from the processed ground images regarding recognized landing zone markings of the identified lane if available, a relative position of the identified lane based on destination configuration data, and a relative geometry of the identified lane. The tracking during landing a left and a right side edge, a front edge, and a runway center line of the assigned runway may comprise: determining the front edge by correcting a recognized front edge of the assigned runway, which was recognized in the ground images, to be parallel to the image coordinate axis of the image sensor; or predicting the length of the front edge of the assigned runway in a ground image using navigation data and finding, as the front edge of the assigned runway, a line parallel to the image coordinate axis and across the left and right side edges that has the predicted length. The tracking during landing a left and a right side edge, a front edge, and a runway center line of the assigned runway further may comprise calculating the runway center line by connecting the midpoint of the runway front edge and the intersection point of the left and right side edges. The determining whether a relative position of the vehicle during landing is left of, right of, or aligned with the runway center line may comprise determining the relative position based on an error measurement between an obtained center line and a perpendicular line. The determining whether a relative position of the vehicle during landing is left of, right of, or aligned with the runway center line further may comprise: determining that the aircraft is on an extended runway center line when $$\left|\frac{(\psi_1 + \psi_2)}{2} - 90°\right| \le \varepsilon;$$

determining that the aircraft is to the right of the extended runway center line when $$\frac{(\psi_1 + \psi_2)}{2} < 90° - \varepsilon;$$

and determining that the aircraft is to the left of the extended runway center line when $$\frac{(\psi_1 + \psi_2)}{2} > 90° + \varepsilon;$$

wherein $\psi_1$ is an angle in a ground image between the front edge and a calculated center line, $\psi_2$ is an angle in the ground image between the front edge and a recognized center line when the center line is recognized and is set to $\psi_1$ when the center line is not recognized, and $\varepsilon$ is a predetermined parameter.

In another embodiment, a non-transitory computer-readable medium having stored thereon instructions that when executed by a processor cause the processor to perform a method for providing visual cues to an aerial vehicle operator is disclosed. The method comprises: determining when a vehicle is on final approach to a landing runway based on monitored aerial vehicle status information; processing, responsive to determining that the vehicle is on final approach to the landing runway, a plurality of ground images of a ground path ahead of the vehicle retrieved from an image sensor on the vehicle; identifying a lane in the processed ground images; determining whether the identified lane from the processed ground images corresponds to an assigned runway for landing based on a relative position of the identified lane relative to another lane in the ground images or a relative geometry of the identified lane relative to another lane in the ground images when landing zone markings are not recognized in the ground images or recognized landing zone markings in the ground images are not sufficient to determine that the identified lane is the assigned runway; tracking during landing, based on the processed ground images, a left and a right side edge, a front edge, and a runway center line of the assigned runway; determining, relative to the runway center line, whether a relative position of the vehicle during landing is left of, right of, or aligned with the runway center line; and providing visual and/or audible guidance to the vehicle operator to take corrective action when the relative position of the vehicle during landing is not aligned with the runway center line.

These aspects and other embodiments may include one or more of the following features. The method may further comprise: predicting, based on the processed image information and aerial vehicle status information, whether a glide path of the vehicle will result in vehicle wheel touch down inside an expected landing zone; and providing visual and/or audible guidance to the vehicle operator to take corrective action when the predicted touch down is outside of the expected landing zone. The predicting whether the glide path of the vehicle will result in vehicle wheel touch down inside the expected landing zone may comprises defining an expected landing block; and determining if a vehicle aim point is inside the landing block based on vehicle flare trajectory and deceleration capability. The identifying a lane in the processed ground images may comprise: applying greyscale conversion and a Gaussian blur algorithm to reduce noise; and performing edge detection using a Canny edge detector, template matching, or OCR (optical character recognition) technology. The determining whether the identified lane from the processed ground images corresponds to an assigned runway for landing may comprise applying a voting algorithm to determine whether the identified lane from the processed ground images corresponds to an assigned runway for landing, wherein the voting algorithm weighs data from the processed ground images regarding recognized landing zone markings of the identified lane if available, a relative position of the identified lane based on destination configuration data, and a relative geometry of the identified lane. The tracking during landing a left and a right side edge, a front edge, and a runway center line of the assigned runway may comprise: determining the front edge by correcting a recognized front edge of the assigned runway, which was recognized in the ground images, to be parallel to the image coordinate axis of the image sensor; or predicting the length of the front edge of the assigned runway in a ground image using navigation data and finding, as the front edge of the assigned runway, a line parallel to the image coordinate axis and across the left and right side edges that has the predicted length. The tracking during landing a left and a right side edge, a front edge, and a runway center line of the assigned runway further may comprise calculating the runway center line by connecting the midpoint of the runway front edge and the intersection point of the left and right side edges. The determining whether a relative position of the vehicle during landing is left of, right of, or aligned with the runway center line may comprise determining the relative position based on an error measurement between an obtained center line and a perpendicular line. The determining whether a relative position of the vehicle during landing is left of, right of, or aligned with the runway center line further may comprise: determining that the aircraft is on an extended runway center line when $$\left| \frac{(\psi_1 + \psi_2)}{2} - 90° \right| \le \varepsilon;$$

determining that the aircraft is to the right of the extended runway center line when $$\frac{(\psi_1 + \psi_2)}{2} < 90° - \varepsilon;$$

and determining that the aircraft is to the left of the extended runway center line when $$\frac{(\psi_1 + \psi_2)}{2} > 90° + \varepsilon;$$

wherein $\psi_1$ is an angle in a ground image between the front edge and a calculated center line, $\psi_2$ is an angle in the ground image between the front edge and a recognized center line when the center line is recognized and is set to $\psi_1$ when the center line is not recognized, and $\varepsilon$ is a predetermined parameter.

A system for providing visual cues to an aerial vehicle operator is disclosed. The system comprises a controller configured to: monitor aerial vehicle status (e.g., including on one or more of vehicle position, altitude, speed, flight path angle, vehicle configuration based on flap/landing gear status, runway information and/or flight plan data from a Flight Management System or other onboard navigation system) to determine when the vehicle is on a final approach to a landing runway; process, responsive to determining that the vehicle is on a final approach to the landing runway, a plurality of ground images retrieved from sensors on the vehicle of a ground path ahead of the vehicle; extract runway information for a runway from the processed ground images, the runway information including the identity of a lane in the ground images; determine when an identified lane corresponds to an assigned landing runway based on a voting algorithm that considers one or more of recognized landing zone markings of the identified lane, relative position of the identified lane based on destination configuration data, and relative geometry of the identified lane; track the assigned runway during landing including recognizing left and right side edges of the assigned runway, recognizing a front edge of the assigned runway when recognizable, predicting the front edge of the assigned runway when the front edge is not recognizable, and determining a runway center line for the assigned runway (recognized or computed based on the front, left side, and right side edges of the assigned runway); determine a relative position (left, right or middle) of the aircraft relative to the runway center line; predict, based on the processed image information and the vehicle status, whether the glide path of the vehicle will result in vehicle wheel touch down inside an expected landing zone (based on the flare trajectory of the vehicle and the deceleration capability of the vehicle) or outside of the landing zone (resulting in an under-shoot or an overshoot of the assigned runway); and provide visual and/or audible guidance (alerting or/and correction cues) to the vehicle operator to take corrective action when the vehicle is not aligning with the runway center line or when the predicted touch down is outside of the expected landing zone.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in software executed by a processor, or in a combination of the two. A software may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for providing visual cues to an aerial vehicle operator, the system comprising a controller configured to:
   determine when a vehicle is on final approach to a landing runway based on monitored aerial vehicle status information;
   process, responsive to determining that the vehicle is on final approach to the landing runway, a plurality of ground images of a ground path ahead of the vehicle retrieved from an image sensor on the vehicle;
   identify a lane in the processed ground images;
   determine whether the identified lane from the processed ground images corresponds to an assigned runway for landing based on a relative position of the identified lane relative to another lane in the ground images or a relative geometry of the identified lane relative to another lane in the ground images when landing zone markings are not recognized in the ground images or recognized landing zone markings in the ground images are not sufficient to determine that the identified lane is the assigned runway;
   track during landing, based on the processed ground images, a left and a right side edge, a front edge, and a runway center line of the assigned runway;
   determine, relative to the runway center line, whether a relative position of the vehicle during landing is left of, right of, or aligned with the runway center line; and
   provide visual and/or audible guidance to the vehicle operator to take corrective action when the relative position of the vehicle during landing is not aligned with the runway center line.

2. The system of claim 1, wherein the controller is further configured to:
   predict, based on the processed image information and aerial vehicle status information, whether a glide path of the vehicle will result in vehicle wheel touch down inside an expected landing zone; and
   provide visual and/or audible guidance to the vehicle operator to take corrective action when the predicted touch down is outside of the expected landing zone.

3. The system of claim 2, wherein to predict whether the glide path of the vehicle will result in vehicle wheel touch down inside the expected landing zone the controller is configured to:
   define an expected landing block; and
   determine if a vehicle aim point is inside the landing block based on vehicle flare trajectory and deceleration capability.

4. The system of claim 1, wherein to identify a lane in the processed ground images, the controller is configured to apply greyscale conversion and a Gaussian blur algorithm to reduce noise.

5. The system of claim 4, wherein to identify a lane in the processed ground images, the controller is configured to perform edge detection using a Canny edge detector, template matching, or OCR (optical character recognition) technology.

6. The system of claim 1, wherein to determine whether the identified lane from the processed ground images corresponds to an assigned runway for landing the controller is configured to apply a voting algorithm to determine whether the identified lane from the processed ground images corresponds to an assigned runway for landing, wherein the voting algorithm weighs data from the processed ground images regarding recognized landing zone markings of the identified lane if available, a relative position of the identified lane based on destination configuration data, and a relative geometry of the identified lane.

7. The system of claim 1, wherein to track during landing a left and a right side edge, a front edge, and a runway center line of the assigned runway, the controller is configured to:
determine the front edge by correcting a recognized front edge of the assigned runway, which was recognized in the ground images, to be parallel to the image coordinate axis of the image sensor; or
predict the length of the front edge of the assigned runway in a ground image using navigation data and find, as the front edge of the assigned runway, a line parallel to the image coordinate axis and across the left and right side edges that has the predicted length.

8. The system of claim 7, wherein to track during landing a left and a right side edge, a front edge, and a runway center line of the assigned runway, the controller is configured to calculate the runway center line by connecting the midpoint of the runway front edge and the intersection point of the left and right side edges.

9. The system of claim 1, wherein to determine whether a relative position of the vehicle during landing is left of, right of, or aligned with the runway center line the controller is configured to determine the relative position based on an error measurement between an obtained center line and a perpendicular line.

10. The system of claim 9, wherein to determine whether a relative position of the vehicle during landing is left of, right of, or aligned with the runway center line the controller is further configured to:
determine that the aircraft is on an extended runway center line when $$\left| \frac{(\psi_1 + \psi_2)}{2} - 90° \right| \leq \varepsilon;$$

determine that the aircraft is to the right of the extended runway center line when $$\frac{(\psi_1 + \psi_2)}{2} < 90° - \varepsilon;$$

and
determine that the aircraft is to the left of the extended runway center line when $$\frac{(\psi_1 + \psi_2)}{2} > 90° + \varepsilon;$$

wherein $\psi_1$ is an angle in a ground image between the front edge and a calculated center line, $\psi_2$ is an angle in the ground image between the front edge and a recognized center line when the center line is recognized and is set to $\psi_1$ when the center line is not recognized, and $\varepsilon$ is predetermined parameter.

11. A processor-implemented method for providing visual cues to an aerial vehicle operator, the method comprising:
determining when a vehicle is on final approach to a landing runway based on monitored aerial vehicle status information;
processing, responsive to determining that the vehicle is on final approach to the landing runway, a plurality of ground images of a ground path ahead of the vehicle retrieved from an image sensor on the vehicle;
identifying a lane in the processed ground images;
determining whether the identified lane from the processed ground images corresponds to an assigned runway for landing based on a relative position of the identified lane relative to another lane in the ground images or a relative geometry of the identified lane relative to another lane in the ground images when landing zone markings are not recognized in the ground images or recognized landing zone markings in the ground images are not sufficient to determine that the identified lane is the assigned runway;
tracking during landing, based on the processed ground images, a left and a right side edge, a front edge, and a runway center line of the assigned runway;
determining, relative to the runway center line, whether a relative position of the vehicle during landing is left of, right of, or aligned with the runway center line; and
providing visual and/or audible guidance to the vehicle operator to take corrective action when the relative position of the vehicle during landing is not aligned with the runway center line.

12. The method of claim 11, further comprising:
predicting, based on the processed image information and aerial vehicle status information, whether a glide path of the vehicle will result in vehicle wheel touch down inside an expected landing zone; and
providing visual and/or audible guidance to the vehicle operator to take corrective action when the predicted touch down is outside of the expected landing zone.

13. The method of claim 12, wherein predicting whether the glide path of the vehicle will result in vehicle wheel touch down inside the expected landing zone comprises:
defining an expected landing block; and
determining if a vehicle aim point is inside the landing block based on vehicle flare trajectory and deceleration capability.

14. The method of claim 11, wherein identifying a lane in the processed ground images comprises:
applying greyscale conversion and a Gaussian blur algorithm to reduce noise; and
performing edge detection using a Canny edge detector, template matching, or OCR (optical character recognition) technology.

15. The method of claim 11, wherein determining whether the identified lane from the processed ground images corresponds to an assigned runway for landing comprises applying a voting algorithm to determine whether the identified lane from the processed ground images corresponds to an assigned runway for landing, wherein the voting algorithm weighs data from the processed ground images regarding recognized landing zone markings of the identified lane if available, a relative position of the identified lane based on destination configuration data, and a relative geometry of the identified lane.

16. The method of claim 11, wherein tracking during landing a left and a right side edge, a front edge, and a runway center line of the assigned runway comprises:
determining the front edge by correcting a recognized front edge of the assigned runway, which was recognized in the ground images, to be parallel to the image coordinate axis of the image sensor; or
predicting the length of the front edge of the assigned runway in a ground image using navigation data and finding, as the front edge of the assigned runway, a line parallel to the image coordinate axis and across the left and right side edges that has the predicted length.

17. The method of claim 16, wherein tracking during landing a left and a right side edge, a front edge, and a runway center line of the assigned runway further comprises calculating the runway center line by connecting the midpoint of the runway front edge and the intersection point of the left and right side edges.

18. The method of claim 11, wherein determining whether a relative position of the vehicle during landing is left of, right of, or aligned with the runway center line comprises determining the relative position based on an error measurement between an obtained center line and a perpendicular line.

19. The method of claim 18, wherein determining whether a relative position of the vehicle during landing is left of, right of, or aligned with the runway center line further comprises:

determining that the aircraft is on an extended runway center line when $$\left| \frac{(\psi_1 + \psi_2)}{2} - 90° \right| \leq \varepsilon;$$

determining that the aircraft is to the right of the extended runway center line when $$\frac{(\psi_1 + \psi_2)}{2} < 90° - \varepsilon;$$

and determining that the aircraft is to the left of the extended runway center line when $$\frac{(\psi_1 + \psi_2)}{2} > 90° + \varepsilon;$$

wherein $\psi_1$ is an angle in a ground image between the front edge and a calculated center line, $\psi_2$ is an angle in the ground image between the front edge and a recognized center line when the center line is recognized and is set to $\psi_1$ when the center line is not recognized, and $\varepsilon$ is predetermined parameter.

20. A non-transitory computer-readable medium having stored thereon instructions that when executed by a processor cause the processor to perform a method for providing visual cues to an aerial vehicle operator, the method comprising:

determining when a vehicle is on final approach to a landing runway based on monitored aerial vehicle status information;

processing, responsive to determining that the vehicle is on final approach to the landing runway, a plurality of ground images of a ground path ahead of the vehicle retrieved from an image sensor on the vehicle;

identifying a lane in the processed ground images;

determining whether the identified lane from the processed ground images corresponds to an assigned runway for landing based on a relative position of the identified lane relative to another lane in the ground images or a relative geometry of the identified lane relative to another lane in the ground images when landing zone markings are not recognized in the ground images or recognized landing zone markings in the ground images are not sufficient to determine that the identified lane is the assigned runway;

tracking during landing, based on the processed ground images, a left and a right side edge, a front edge, and a runway center line of the assigned runway;

determining, relative to the runway center line, whether a relative position of the vehicle during landing is left of, right of, or aligned with the runway center line;

providing visual and/or audible guidance to the vehicle operator to take corrective action when the relative position of the vehicle during landing is not aligned with the runway center line;

predicting, based on the processed image information and aerial vehicle status information, whether a glide path of the vehicle will result in vehicle wheel touch down inside an expected landing zone; and providing visual and/or audible guidance to the vehicle operator to take corrective action when the predicted touch down is outside of the expected landing zone.

* * * * *